United States Patent [19]

Kaieda et al.

[11] 4,183,030

[45] Jan. 8, 1980

[54] INK JET RECORDING APPARATUS

[75] Inventors: Shozo Kaieda, Yokohama; Masayuki Mutoh, Kawasaki; Kuniaki Kamimura, Atsugi, all of Japan

[73] Assignee: Minolta Camera Kabushiki Kaisha, Osaka, Japan

[21] Appl. No.: 783,031

[22] Filed: Mar. 30, 1977

[30] Foreign Application Priority Data

| Apr. 1, 1976 | [JP] | Japan | 51-36753 |
| Apr. 15, 1976 | [JP] | Japan | 51-47801[U] |
| Apr. 23, 1976 | [JP] | Japan | 51-48207 |
| May 12, 1976 | [JP] | Japan | 51-54758 |
| Jun. 1, 1976 | [JP] | Japan | 51-64403 |

[51] Int. Cl.$^2$ ............................................. G01D 15/18
[52] U.S. Cl. .................................. 346/140 R; 346/75
[58] Field of Search ............................ 346/140 R, 75

[56] References Cited

U.S. PATENT DOCUMENTS

| 3,060,429 | 10/1962 | Winston | 346/75 X |
| 3,787,882 | 1/1974 | Fillmore et al. | 346/140 R X |
| 3,909,831 | 9/1975 | Marchio et al. | 346/140 R |
| 3,968,498 | 7/1976 | Uchiyama | 346/140 R X |
| 4,050,075 | 9/1977 | Hertz et al. | 346/140 R X |
| 4,065,775 | 12/1977 | Hou et al. | 346/140 R |

*Primary Examiner*—George H. Miller, Jr.
*Attorney, Agent, or Firm*—Wenderoth, Lind & Ponack

[57] ABSTRACT

An ink jet recording apparatus which effects non-impact recording by the application of a jet of ink to a recording medium while the amount of ink to be jetted towards the recording medium is controlled to render it proportional to the recording velocity. For this purpose, the ink jet recording apparatus is provided with a feed-back loop system through which an electrical signal indicative of the pressure acting on the ink within an ink tank is fed back to a comparator to control operation of a compressed air source from which the pressure is applied to compensate for reduction in static pressure of the ink within the ink tank resulting from consumption of the ink. For maintaining the amount of the ink jetted proportional to the recording velocity, various arrangements are disclosed.

14 Claims, 67 Drawing Figures

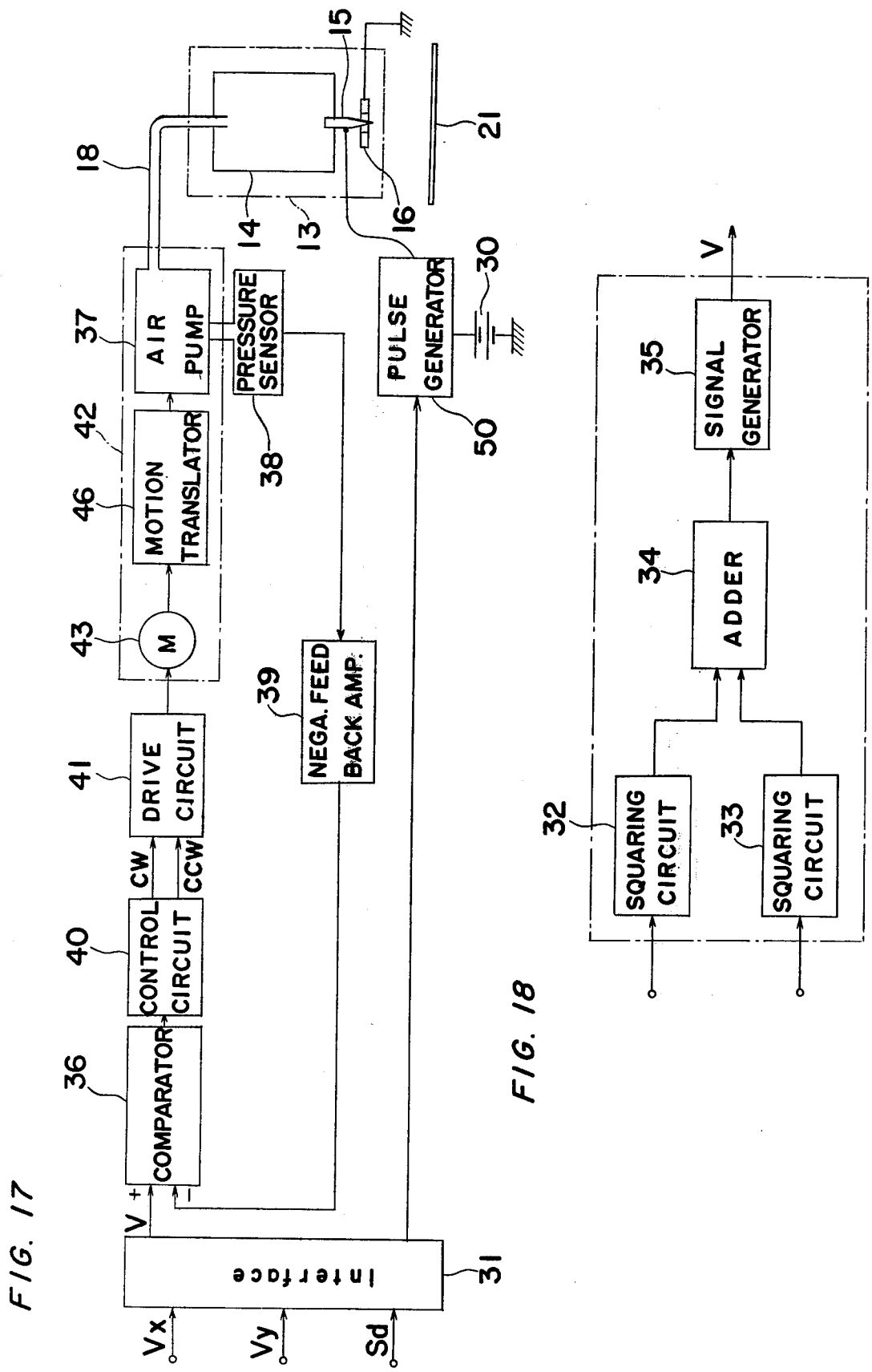

FIG. 39
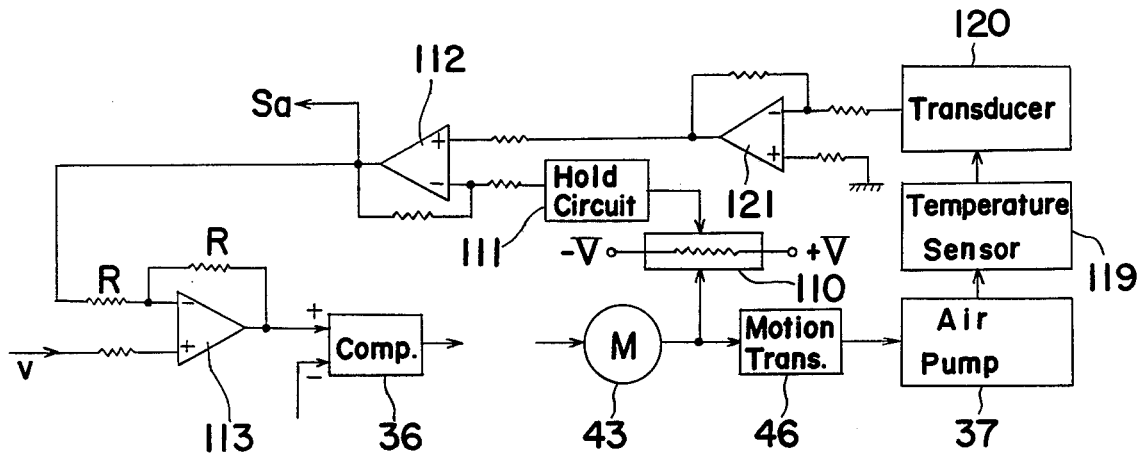
FIG. 40
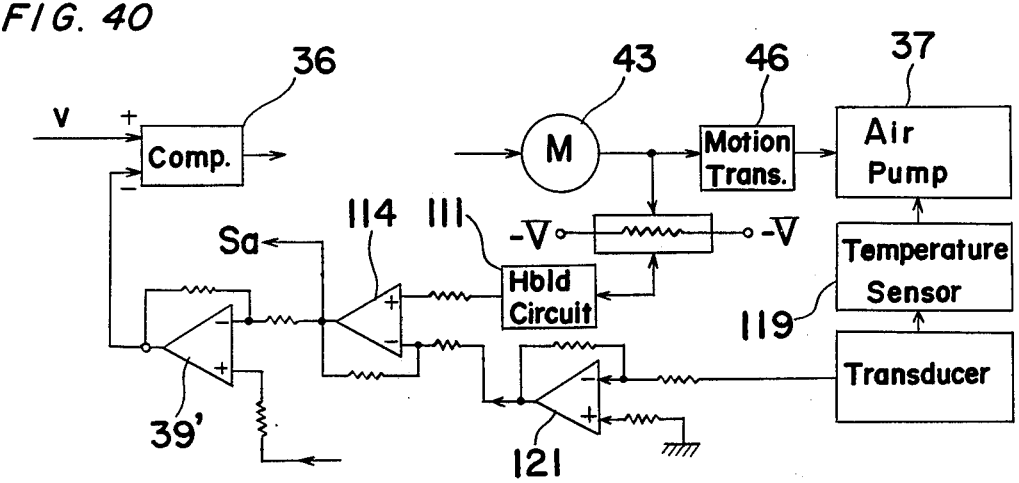
FIG. 41    FIG. 42    FIG. 43    FIG. 44
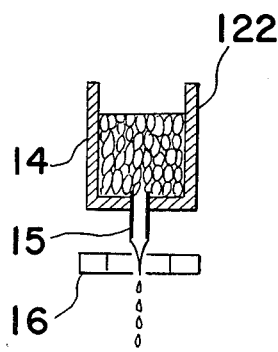 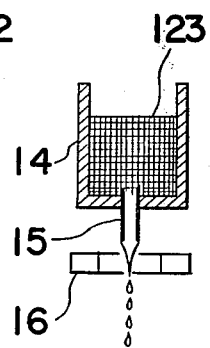 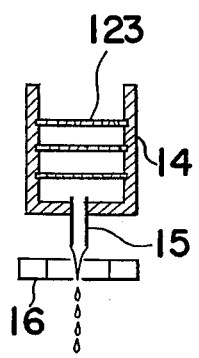 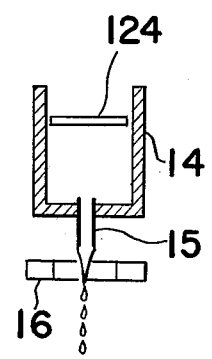

INK JET RECORDING APPARATUS

BACKGROUND OF THE INVENTION

The present invention relates to an ink jet recording apparatus and, more particularly, to an ink jet recording apparatus having means for controlling the amount of ink jetted towards a recording medium.

An ink jet recording apparatus has hertofore been used as a device for delineating a line, character or figure by the utilization of fine droplets of ink successively jetted from an ink tank through a fine nozzle. By way of example, where this type of ink jet recording apparatus is employed in an X-Y plotter, ink within the ink tank is jetted in the form of fine droplets through the nozzle at a relatively high frequency towards the recording medium so that the ink droplets deposited on the recording medium will form a continuous line.

U.S. Pat. No. 3,968,498, patented on July, 1976, for example, discloses an ink jet recording apparatus employed in an X-Y plotter. In general, since the ink jet recording apparatus intended for use in the X-Y plotter is required to satisfy the requirement that initiation and interruption of the jetting of ink must precisely respond to the presence and absence of a command signal (which corresponds to UP-DOWN signals employed in an X-Y plotter of a type utilizing a writing pen, which UP-DOWN signals are selectively used to disengage and engage the tip of the writing pen from and to the recording medium), an ink jet recording apparatus of the non-impact recording type wherein application of electric voltage between the nozzle and an electrode positioned in the vicinity of the nozzle results in jetting of ink from the nozzle towards the recording medium is recommended for use in the X-Y plotter.

In the above numbered U.S. patent, the statement has been made that, where the ink jet recording apparatus is employed in the X-Y plotter, a resultant delineated line of uniform width cannot be obtained unless the amount of ink jetted is caused to vary with change in recording velocity. Starting from this problem, the above numbered U.S. patent discloses concrete means for solving the above described problem, such as by the employment of a technique wherein the voltage to be applied between the nozzle and the electrode is made proportional to the recording velocity, a technique wherein the frequency of vibrations applied to the ink within the ink tank is made proportional to the recording velocity or a combination of these techniques.

However, it has been found that the voltage applied between the nozzle and the electrode and the amount of ink jetted has a proportional relationship only within a limited range. Moreover, it has also been found that the employment of a method wherein vibrations or pulsating pressures are applied to the ink within the ink tank has a disadvantage that an exact proportional relationship cannot be obtained between the pressure and the amount of ink jetted and that the recording head and its related parts are adversely affected by such vibrations.

Furthermore, in the conventional method particularly wherein pressure is applied to the ink within the ink tank during jetting of the ink, since actual measurement of the pressure thus applies is not made, a precise control of the amount of ink jetted is not achieved. Moreover, the conventional ink jet recording apparatus wherein vibrations are employed to apply the pressure to the ink is not suited for delineating a line since the frequency or speed of formation of the ink droplets is very low.

Where control of the amount of ink jetted is effected in the manner as herein-above described in the conventional ink jet recording apparatus, no consideration has been paid to the relationship between the change in viscosity of the ink resulting from a change in temperature, the amount of ink within the ink tank, the pressure acting on the ink and the voltage applied between the nozzle and the electrode, all of which have been found to affect the amount of ink being jetted from the nozzle towards the recording medium.

Moreover, in the case where the ink jet recording apparatus is to be employed in the X-Y plotter, although the employment of a control technique necessary to control the amount of ink jetted so that a line of uniform width can be obtained without being substantially adversely affected by the recording velocity and other factors provides the possibility that lines of different width can be delineated on the recording medium one at a time with a single nozzle, such use has not yet been made of the conventional device.

In view of the foregoing, the use of a conventional ink jet recording apparatus involves various problems which must be solved in order for it to be satisfactory for an X-Y plotter.

SUMMARY OF THE INVENTION

Accordingly, the present invention has for its essential object to provide an ink jet recording apparatus of a type wherein means is provided for varying the pressure acting on the ink to accurately control the amount of ink jetted.

Another object of the present invention is to provide an ink jet recording apparatus of the type referred to above wherein the pressure acting on the ink can be varied in correspondence with the recording velocity to make the amount of ink jetted proportional to the recording velocity thereby controlling the amount of ink jetted so that a line of uniform width can be delineated on the recording medium.

A further object of the present invention is to provide an ink jet recording apparatus of the type referred to above wherein means is provided for preventing a change in viscosity of the ink incident to a change in temperature, or reduction in the amount of ink within the ink tank, from adversely affecting the amount of ink jetted.

A still further object of the present invention is to provide an ink jet recording apparatus of the type referred to above wherein positive air pressure control means is provided for enabling the amount of ink jetted to be controlled by the pneumatic pressure acting on the top surface of the ink within the ink tank.

A still further object of the present invention is to provide an ink jet recording apparatus of the type referred to above which includes means for moving the ink jet recording apparatus from any point above the recording medium to a predetermined position, where the ink jetted does not adversely affect the recording medium, so that jetting of ink can be performed on a trial basis.

A still further object of the present invention is to provide an ink jet recording apparatus of the type referred to above which can delineate lines of different width one at a time with only a single nozzle.

A still further object of the present invention is to provide an ink jet recording apparatus of the type referred to above in which the recording medium can be a highly electrically insulating film which is treated to have an electroconductive property.

A still further object of the present invention is to provide an ink jet recording apparatus of the type referred to above which basically comprises means for detecting the pressure acting on the surface of the ink within the ink tank, means for generating an electric signal of a value corresponding to a pressure which in turn corresponds to a preferred amount of ink to be jetted, means for comparing an output signal from the pressure detecting means with the signal from the signal generating means, and pressure control means responsive to the output from the comparing means for controlling the pressure acting on the top surface of the ink within the ink tank.

BRIEF DESCRIPTION OF THE DRAWING

These and other objects and features of the present invention will become apparent from the following description taken in conjunction with preferred embodiments thereof with reference to the accompanying drawings, in which:

FIG. 17 is a schematic block diagram showing a circuitry for the ink jet recording apparatus embodying the present invention;

FIG. 18 is a block diagram showing a velocity signal generating circuit forming a part of the circuit shown in FIG. 17;

FIG. 39 is a circuit diagram showing a temperature compensating means which can be employed in the ink jet recording apparatus embodying the present invention;

FIG. 40 is a circuit diagram showing a modified form of the temperature compensating means shown in FIG. 39;

FIGS. 41 to 44 are sectional views of the ink tank showing different forms of a stabilizer accommodated within the tank for stabilizing the body of ink within the ink tank;

DETAILED DESCRIPTION OF THE INVENTION

Figure 1:
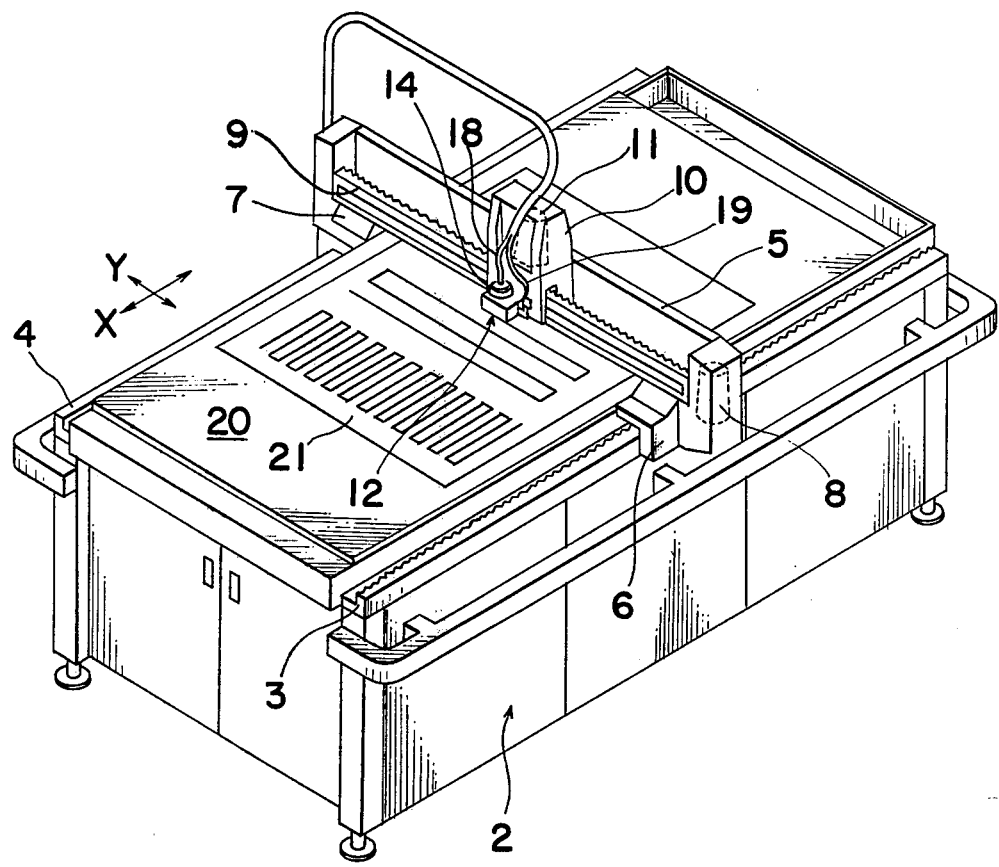
FIG. 1 is a schematic perspective view of an X-Y plotter employing an ink jet recording apparatus of the present invention.
Figure 2:
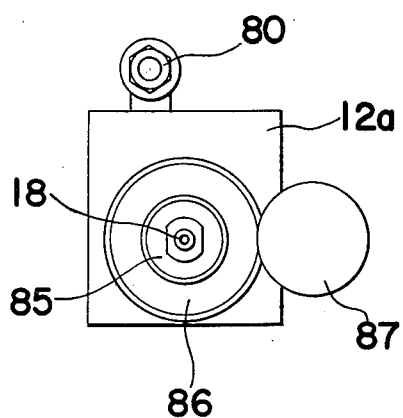
FIG. 2 is a top plan view of an ink jet generating unit employed in the ink jet recording apparatus.

Before the description of the present invention proceeds, it is to be noted that like parts are designated by like reference numerals throughout the accompanying drawings.

Referring now to FIG. 1, there is illustrated an X-Y plotter incorporating an ink jet recording apparatus according the present invention. In FIG. 1, the illustrated X-Y plotter has a pair of spaced parellel rails 3 and 4 rigidly mounted on a machine framework or bench 2, one of said rails 3 having a toothed side and therefore constituting a guide rack. Extending between the rack 3 and the rail 4 over a flat support 20 on the machine framework 2 is an X-axis carriage 5 supported in position for movement in one direction parallel to the X-axis of the coordinates and, particularly, parallel to the lengthwise direction of the rails 3 and 4. The X-axis carriage 5 has its opposed ends rigidly connected respectively to movable supports 6 and 7 which are movably mounted on the rack 3 and the rail 4. For effecting the movement of the X-axis carriage 5 in the X-axis direction, one of the movable supports 6 which is mounted on the rack 3 has housed therein a servo-motor 8 having a drive shaft (not shown) operatively engaged to the rack 3 through a pinion (not shown) by way of any suitable transmission system for driving the X-axis carriage 5 in the X-axis direction.

The X-axis carriage 5 carries a rack 9 rigidly mounted thereon and extending parallel to the lengthwise direction of the X-axis carriage 5. Mounted on the rack 9 for movement in a direction parallel to the Y-axis of the coordinates and, particularly, perpendicular to the direction of movement of the X-axis carriage 5, is a Y-axis carriage 10 having therein a servo-motor 11 having a drive shaft (not shown) engaged to the rack 9 through a pinion (not shown) by way of any suitable transmission system (not shown).

The Y-axis carriage 10 carries a recording head 12 rigidly secured thereto and supporting an ink jet generating unit 13 in a manner as will be described in more detail later. Externally extending from a source of compressed air and a control circuitry, all housed within the machine framework 2, towards the ink jet generating unit 13 are a flexible tube 18, through which compressed air is supplied to an ink tank 14, and a bundle of high voltage supply cables 19 through which high voltage from a high voltage source is applied, the length of the tube 18 and the cable bundle 19 being so selected that the movement of the X-axis and Y-axis carriages 5 and 10 will not be obstructed during a recording operation.

The flat support 20 on the machine framework 2 is so designed as to support thereon a recording medium 21, such as a sheet of paper, without permitting the latter to be deformed and/or displaced during the recording operation.

The X-Y plotter thus far described is so designed that an intelligence signal, generated from a source thereof, for example, a programmed computer, is delineated in the form of visual information such as lines, figures or characters, on the recording medium 21 while the angle of rotation of any one of the servo-motors 8 and 10 is controlled to reflect the contents of the intelligence signal.

Figure 3:
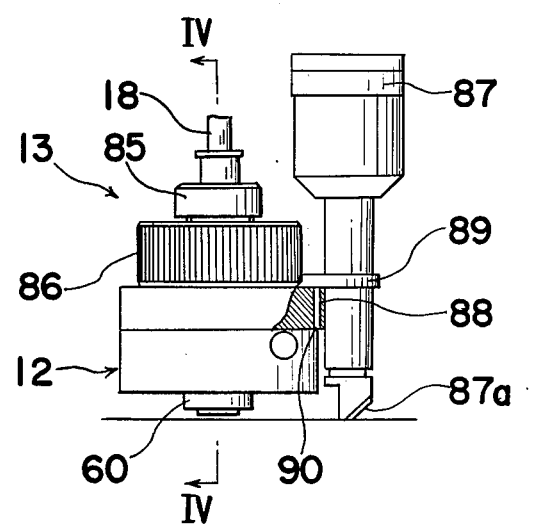
FIG. 3 is a side elevational view of the ink jet generating unit shown in FIG. 2.
Figure 4:
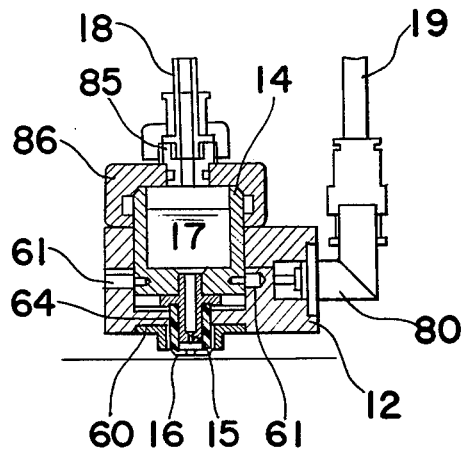
FIG. 4 is a cross sectional view taken along the line IV—IV in FIG. 3.
Figure 5:
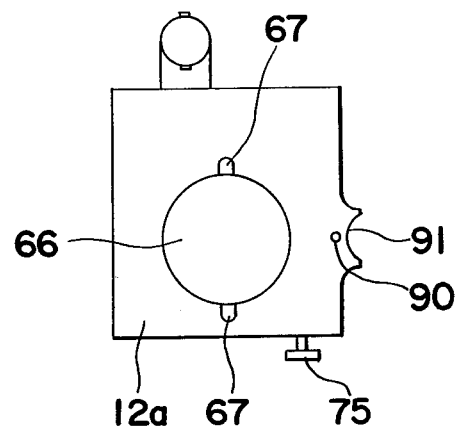
FIG. 5 is a top plan view of an upper body of a recording head with an ink tank removed.
Figure 6:
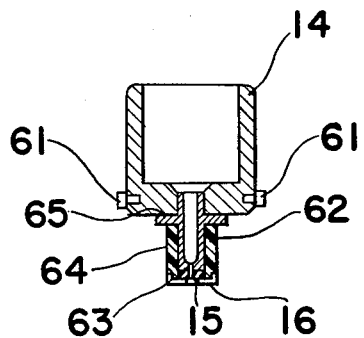
FIG. 6 is a longitudinal sectional view of the ink tank.
Figure 7:
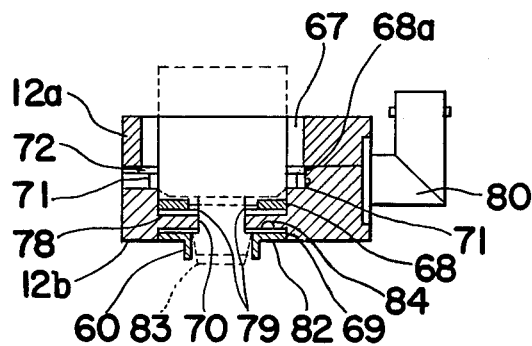
FIG. 7 is a longitudinal sectional view of a lower body of the recording head.
Figure 8:
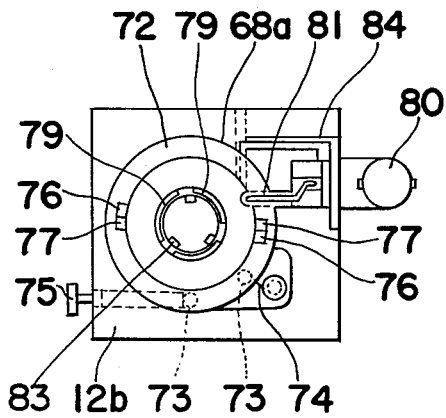
FIG. 8 is a top plan view of the lower body of the recording head.
Figure 9:
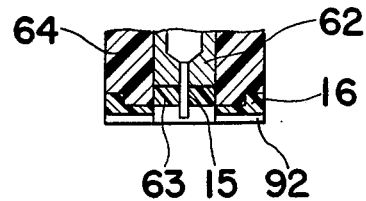
FIG. 9 is a longitudinal sectional view, on an enlarged scale, of a portion of the ink tank, showing the details of the structure in the vicinity of the tip of a nozzle carried by the ink tank.

Referring to FIGS. 2 to 10, the ink jet generating unit 13 comprises the ink tank 14 having a predetermined amount of ink 17 therein, a nozzle 15 through which a series of fine droplets are jetted from the ink tank 14 towards the recording medium 21, and a ring-shaped electrode 16 positioned adjacent the nozzle 15. As best shown in FIGS. 4 and 6, the ink tank 14 is in the form of a substantially cylindrical container having one or more, for example, two, positioning pins 61 radially outwardly protruding from the outer peripheral surface thereof, which pins 61 are respectively engageable in mating grooves 71, formed in the recording head 12, in a manner as will be described later. As best shown in FIGS. 6 and 9, the ink tank 14 has a nozzle support 62, made of metallic material, having one end secured to the ink tank 14 and the other, free end thereof receiving the nozzle 15 which is also made of metallic material. Specifically, the nozzle 15 having one end soldered or welded to the nozzle support 62 in alignment with the hollow in said nozzle support 62 extends downwards from said nozzle support 62 through a guide ring 63 of electrically insulating material secured or bonded to the other end of the nozzle support 62. Surrounding of the nozzle support 62 is a protective sheath 64, made of electrically insulating material, such as synthetic resin, for example, formaldehyde polymer, one of the opposed ends of said protective sheath 64 adjacent the nozzle 15 supporting the ring-shaped electrode 16. A seal ring 65 is provided between the bottom of the ink tank 14 and the adjacent end of the nozzle support 62 for avoiding any possible leakage of the ink 17 out of the ink tank 14.

The recording head 12 is constituted by upper and lower bodies 12a and 12b. The upper body 12a has a central bore 66 of a diameter slightly greater than the outer diameter of the ink tank 14 and a pair of opposed guide grooves 67 extending completely through the thickness of the upper body 12a in communication with the bore 66, which guide grooves 67 respectively receive the positioning pins 61. As best shown in FIGS. 7 and 8, the lower body 12b also has a central portion with upper and lower circular recesses 68 and 69 in alignment with each other, the both being of a diameter slightly greater than the other diameter of the ink tank 14. The upper circular recess 68 extends downwards from the upper surface of the lower body 12b while the lower circular recess 69 extends upwards from the lower surface of the same lower body 12b. These recesses 68 and 69 are connected to each other through an opening 70 of a diameter slightly greater than the outer diameter of the protective sheath 64, which opening 70 is defined in the lower body 12b. The lower body 12b has a pair of opposed guide grooves 71 defined therein in communication with the recess 68 and in alignment with the guide grooves 67 in the upper body 12a, and recess 68 has an enlarged area 68a of a diameter greater than the diameter of the remaining portion of said recess 68. A fixing ring 72 is accommodated within the enlarged area of the recess 68 for locking the ink jet generating unit 13 in position in a manner which will be described in more detail later.

The fixer ring 72 has a pair of pins 73 downwardly extending therefrom, one of these pins 73 being so connected with a spring member 74 that the fixing ring 72 is biased in one direction about the longitudinal axis of the opening 70 with the other of said pins 73 engaged with a release button 75 as best shown in FIG. 8. This fixer ring 71 has a pair of opposed cutout portions 76 for the passage of the positioning pins 61 on the ink tank 14 therethrough when the ink tank 14 is mounted on the recording head 12, and inclined surfaces 77 downwardly inclined towards the respective cutout portions 76. Mounted on the bottom of the recess 68 is a high voltage electrode ring 78 having an upper annular face to which three electrode pieces 79 are soldered in equally spaced relation to each other and are held in position to contact a flange portion of the nozzle support 62, when the ink jet generating unit 13 is mounted on the recording head 12, so that a high voltage can be applied to the nozzle 15 through a power supply line 81 having one end connected to a connector 80 and the other end connected to the electrode ring 78, the intermediate portion of said line 81 being positioned in an appropriate groove defined in the head 12.

Positioned within the lower recess 69 is an electrode ring 82 having an inner peripheral face to which three electrode pieces 83 are soldered and from which said electrode pieces 83 extend downwards. These electrode pieces 83 are made of metallic material having a sufficient elasticity so that these electrode pieces 83 can contact the ring-shaped electrode 16 when the ink jet generating unit 13 is mounted on the recording head 12. For applying a voltage, opposed in polarity to the voltage applied to the nozzle 15, to the ring-shaped electrode 16 through the electrode ring 82 and then the electrode pieces 83, a lead line 84 is provided having one end connected to the connector 80 and the other end connected to the electrode ring 82, the intermediate portion of said line 84 being positioned in an appropriate groove defined in the recording head 12. It is to be noted that the electrode ring 82 and the electrode pieces 83 are shielded by an outer protective sheath 60.

Figure 11:
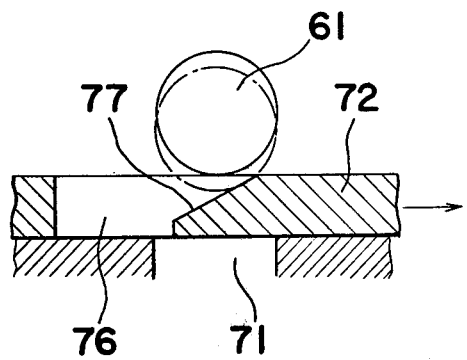
FIGS. 11 to 13 are enlarged partial sectional views illustrating the sequence in which one positioning pin secured to the ink tank is engaged in a groove in the lower body of the recording head to lock the ink tank to the recording head.
Figure 12:
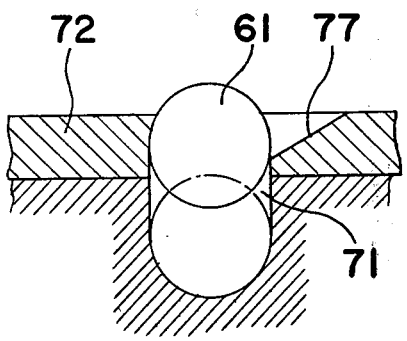
Figure 13:
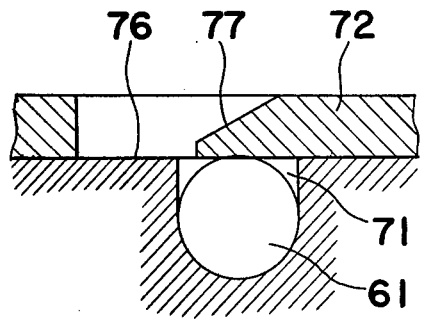

With the construction so far described, when the ink jet generating unit 13 is inserted from above into the bore 66 with the positioning pins 61 aligned with the guide grooves 67, the pins 61 contact the inclined surfaces 77 on the fixing ring 72 as shown in FIG. 11. As the jet generating unit 13 is further pushed, the fixing ring 72 is caused to rotate in a direction against the bias of the spring member 74 with the pins 61 consequently caused to fall into the guide grooves 71 in the lower body 12b after having passed through the cutout portions 76 in the fixing ring 72 as shown in FIG. 12. Subsequent thereto, the fixing ring 72 is rotated being biased by the spring member 74 whereby, as shown in FIG. 13, the pins 61 are confined within the guide grooves 71 in the lower body 12b of the recording head 12 so that the jet generating unit 13 is held in position on the recording head 12 in the manner as shown in FIGS. 3 and 4.

The ink tank 14 includes a closure 86 detachably mounted on the top opening thereof, which closure 86 has a coupling 85 through which the tube 18 is connected to the interior of the ink tank 14.

Removal of the ink jet generating unit 13, including the ink tank 14, from the recording head 12 can be effected by applying an external pushing force to the release button 75 to cause the fixer ring 72 to rotate against the action of the spring member 74 due to the contact of the pin 73 by the inner end of the release button 75. By this action, the cutout portions 76 in the fixer ring 72 are brought immediately above the positioning pins 61 in the ink tank 14, which are then engaged in the guide grooves 71, and, therefore, the jet generating unit 13 can readily be removed from the recording head 12 by lifting it up.

Figure 10:
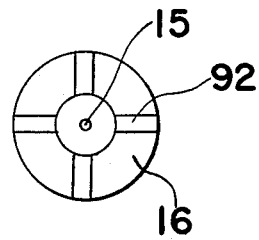
FIG. 10 is a bottom plan view of a portion of the ink tank.

The head 12 is also provided with a loupe 87 for facilitating observation of the ink being jetted from the nozzle 15 towards the recording medium 21. This loupe 87 comprises a reflecting mirror 87a and an optical system including an objective lens assembly and an eyepiece lens assembly and is detachably mounted on the recording head 12 by a support bracket 89 having one or more fixtures 88, such as pin members. Specifically, the recording head 12 has holes 90 for receiving the fixtures 88 and a recess 91, the bottom of which recess 91 is substantially rounded in complemental relation to the cylindrical body of the loupe 87. This loupe 87 can be mounted on the recording head by moving the loupe 87 downwardly with a portion of the outer periphery of the loupe body in contact with the rounded bottom of the recess 91 until the fixtures 88 are substantially completely inserted into the corresponding holes 91. It is to be noted that the ring-shaped electrode 16 is, as best shown in FIGS. 9 and 10, provided with radially outwardly extending jet observation slits 92 which are so designed as to provide no obstruction to the symmetrical development of an electrostatic field.

Figure 14:
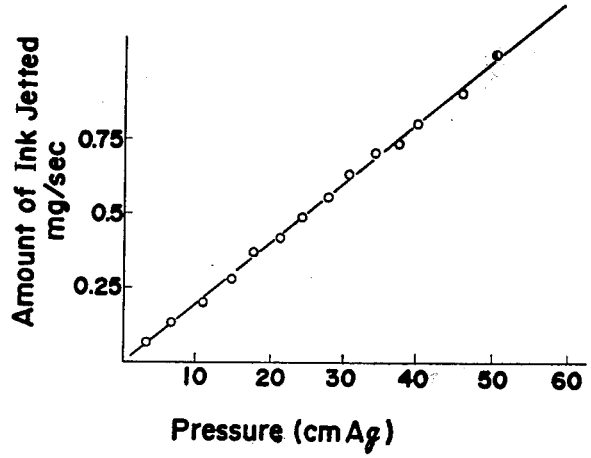
FIG. 14 is a graph showing the relationship between the amount of ink jetted from the nozzle and the pressure acting on the ink within the ink tank.

Referring now to FIG. 14, there is illustrated the graph showing a relationship between the amount of ink jetted from the nozzle 15 and the pressure acting on the top surface of the ink 17 within the tank 14. In preparing the graph of FIG. 14, the ink jet generating unit 13 having the construction as hereinbefore described has been used and the variation in the amount of the jetted ink relative to variation in the pressure acting on the top surface of the ink within the ink tank 14 has been plotted at intervals of one second while the voltage between the nozzle 15 and the ring-shaped electrode 16 was fixed. From the graph of FIG. 14, it is clear that the amount of the jetted ink exhibits a substantially proportional relation to the pressure acting on the ink surface and vice versa. Similarly, variation in the width of a continuous line, drawn on a cylindrical recording medium being rotated at a constant speed while the jet generating unit 13 was moved in a direction parallel to the axis of rotation of the cylindrical recording medium at a predetermined speed, was plotted relative to variation in the amount of the jetted ink which was effected by supplying compressed air into the tank 14 to increase the pressure acting on the ink level surface, the result of which is shown in a graph of FIG. 15. From the graph of FIG. 15, it is clear that the width of the delineated continuous line exhibits a substantially logarithmically proportional relation to the amount of the jetted ink, and vice versa.

Figure 15:
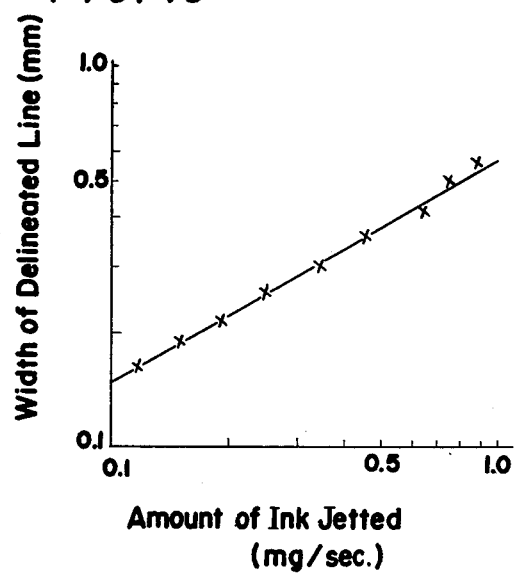
FIG. 15 is a graph showing the relationship between the width of a line delineated by the jet of ink issued from the nozzle and the amount of the ink jetted.

From the graphs of FIGS. 14 and 15, it is clear that the gradient of the straight line interpolated in each of the graphs is determined by such factors as the physical properties of the ink used. Therefore, it can be understood that a precise control of the pressure acting on the ink surface within the ink tank 14 in relation to the recording velocity will result in not only jetting of the ink in an amount appropriate to the recording velocity, but also drawing of a continuous line of uniform width.

To this end, the ink jet recording apparatus embodying the present invention further comprises means for controlling the amount of ink jetted from the tank 14 through the nozzle 15 onto the recording medium 21 in response to variation in the recording velocity, which controlling means is electrically associated with the X-Y control of the X-Y plotter as will now be described.

Figure 16:
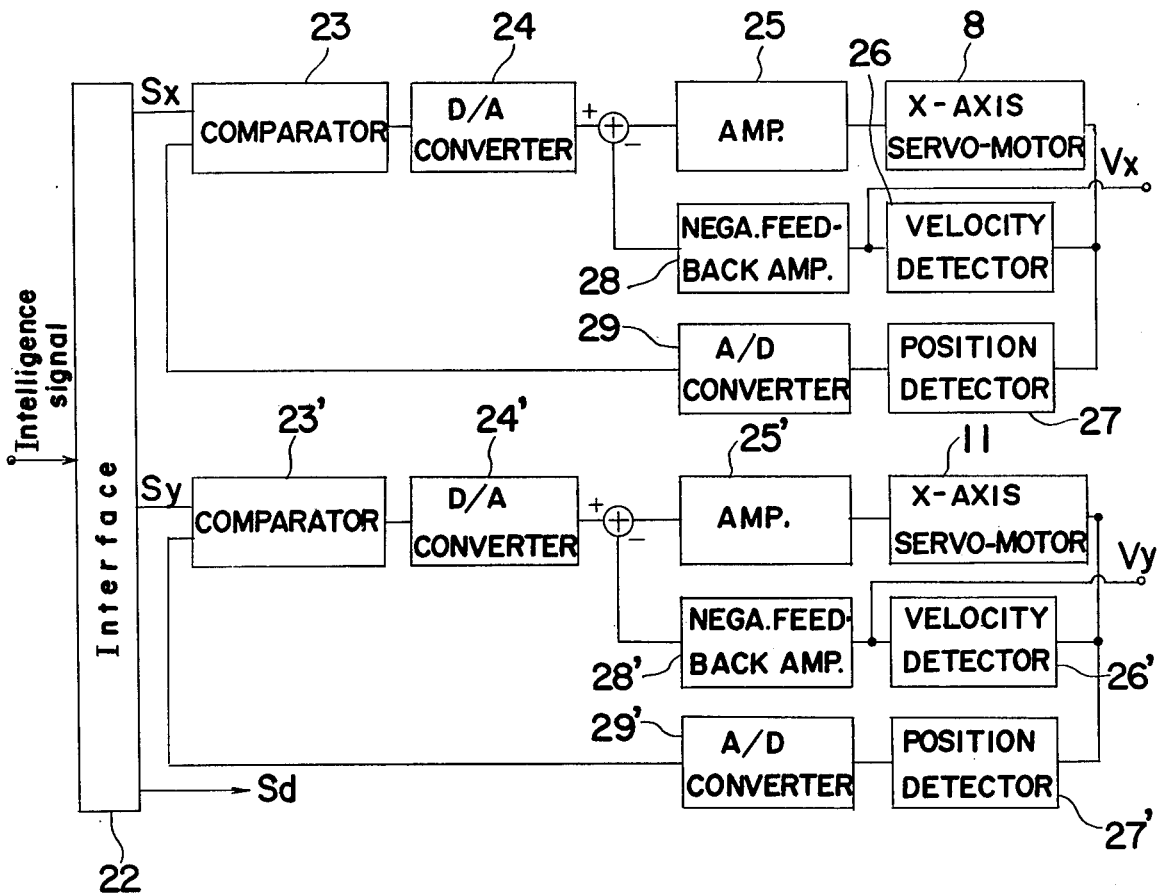
FIG. 16 is a schematic block diagram showing an X-Y servo-control circuitry employed in the X-Y plotter.

Referring to FIG. 16, there is illustrated an electric circuit block diagram of the X-Y servo-control of the X-Y plotter. As is well known to those skilled in the art, the positioning of the recording head 12 carrying the ink jet generating unit 13 used in the X-Y plotter requires a precise control and, for this purpose, a negative feed-back system is employed for the position control. It is, however, to be noted that the illustrated circuit block diagram is applicable only to the X-Y plotter of the type wherein electrical X-axis and Y-axis positioning signals used to position the ink jet generating unit 13 relative to the recording medium 21 are employed in the form of pulses or digital signals and wherein the servo-motors 8 and 11 are each an analog servo-motor. It is also to be noted that, since the servo-control shown in FIG. 16 includes two separate circuit systems for the control of the X-axis servo-motor 8 and for the control of the Y-axis servo-motor 11, respectively, and these two circuit systems are substantially identical in construction and operation, reference will be made only to the system for the control of the X-axis servo-motor 8 for the sake of brevity, the corresponding parts of the system for the control of the Y-axis servo-motor 11 being identified by the prime (') affixed to like reference numerals.

The X-Y servo-control shown in FIG. 16 includes an interface 22 common to both of the circuit systems referred to above, which interface 22 generates, after the intelligence signal has been fed thereto from, for example, a computer (not shown), X-axis and Y-axis positioning signals Sx and Sy in the form of digital signals which are respectively issued from the interface 22 in association with the separate circuit systems referred to above. Considering the X-axis positioning signal Sx, the latter is fed through a comparator 23 to a digital-analog converter 24 wherein the digital signal from the interface 22 is converted into an analog signal. This analog signal issuing from the converter 24 is, after having been amplified by an X-axis servo-amplifier 25, applied to the X-axis servo-motor 8 to cause the latter to be rotated through an angle determined by the amplified analog signal. While the servo-motor 8 is thus rotated, the velocity of rotation of the drive shaft of the motor 8 and the position of said drive shaft of the same motor 8 are respectively detected by a velocity detector 26 and a position detector 27. The velocity detector 26 may be composed of any known speed measuring instrument, for example, a tachometer coupled to the drive shaft of the motor and the position detector 27 may be composed of any known position detector, for example, a resolver. The output signal Vx from the velocity detector 26, which is indicative of the velocity of rotation of the drive shaft of the motor 8, is in part applied to an interface 31, described below, and in part fed-back to a stage preceding the X-axis servo-amplifier 25 through a negative feed-back amplifier 28. On the other hand, the output signal from the position detector 27, which is indicative of the position of the drive shaft of the motor 8, is, after having been converted into a digital signal in an analog-digital converter 29, fed back to the comparator 23 in which the digital signal from the converter 29 is compared with the positioning signal Sx for the purpose of position control of the X-axis carriage 5.

With respect to the system associated with the positioning signal Sy, it operates in a substantially identical manner as hereinbefore described and a similar output signal Vy from the velocity detector 26' is in part fed to the interface 31 and in part fed back to a stage preceding the Y-axis servo-amplifier 25' while a similar output signal from the position detector 27' is, after having converted into a digital signal in the analog-digital converter 29', fed back to the comparator 23' wherein said digital signal from the converter 29' is compared with the positioning signal Sy for the purpose of position control of the Y-axis carriage 10.

In addition to the servo-control of the construction as hereinbefore described, the X-Y plotter embodying the present invention further includes a pressure control for controlling the amount of ink jetted from the tank 14 towards the recording medium 21, the construction of which will now be described in detail with particular reference to FIG. 17 illustrating a block circuit diagram of the pressure control referred to above.

Referring now to FIG. 17, the interface 31 includes a velocity signal synthesizer, a block diagram of which is best shown in FIG. 18, which synthesizes an output signal proportional to $V=\sqrt{Vx^2+Vy^2}$, wherein V represents the recording velocity of the recording head 12, more specifically, the ink jet generating unit 13. The velocity signal synthesizer comprises a pair of squaring circuits 32 and 33 connected in parallel to each other, which are in turn connected to an adder 34 followed by a signal generator 35. Each of the squaring circuits 32 and 33 is so designed that, when the output signal Vx or Vy from the velocity detector 26 or 26' is applied thereto, it produces an output signal indicative of the second power of the velocity of rotation of the drive shaft of the motor 8 or 11. The adder 34 performs an addition to give an output signal indicative of the sum of the second power of the velocity of the drive shaft of the motor 8 and that of the motor 11, which is in turn applied to the signal generator 35 generating the signal V which is equal to the square root of the sum of the second power of the velocity of the drive shaft of the motor 8 and that of the motor 11 as shown by the above formula. This corresponds to the recording velocity, of the ink jet recording head 12.

The velocity signal V thus synthesized in the interface 31 from the signals Vx and Vy is fed to an analog comparator 36, which is composed of a differential amplifier the gain of which is one and which acts to compare the velocity signal V with an analog output signal from a pressure sensor 38. The pressure sensor 38 is used to detect the pressure of compressed air fed from an air pump 37 to the ink tank 14 through the tube 18 and to generate an analog output signal indicative of the pressure of the compressed air, which analog output signal is fed to the comparator 36 through a negative feed-back amplifier 39. A difference signal emerging from the comparator 36, which is indicative of the difference between the signal V and the analog output signal from the pressure sensor 38, is applied to a control circuit 40. The control circuit 40 may be composed of any known window comparator or a pulse converter and is so designed as to generate two types of control signals CW and CCW in synchronism with a clock pulse depending on whether the difference signal from the comparator 36 exceeds a predetermined window width set in the control circuit 40 or whether the difference signal falls below the predetermined window width. More specifically, the control circuit 40 generates the control signal CW when the difference signal from the comparator 36 exceeds the value $+V_R$ while it generates the control signal CCW when the difference signal falls below the value $-V_R$. Although these control signals CW and CCW are applied to a pulse motor drive circuit 41 one at a time, application of the control signal CW to the drive circuit 41 results in a source 42 of compressed air being operated to increase the pressure of the compressed air fed to the ink tank 14 through the tube 18, and application of the control signal CCW to the same drive circuit 41 results in the compressed air source 42 being operated to decrease the pressure of the compressed air fed to the ink tank 14 through the tube 18. However, it is to be understood that the control circuit 40 will not generate any of the control signals CW and CCW so long as the difference signal from the comparator 36 remains within the predetermined window width between the values $+V_R$ and $-V_R$.

The pulse motor drive circuit 41 is so designed as to convert either of the control signals CW and CCw into a trigger signal utilizable to drive a pulse motor 43 and also to amplify the trigger signal. Specifically, the drive circuit 41 when receiving the control signal CW applies a positive trigger signal to the motor 43 to rotate the latter in one direction, for example, a positive direction, and, when receiving the control signal CCW, applies a negative trigger signal to the motor 43 to rotate the latter in the opposite direction, that is, a negative direction. As will be described in more detail later, rotation of the pulse motor 43 in the positive direction causes the air pump 37 to increase the pressure of the compressed air while the rotation of the pulse motor in the negative direction causes the air pump 37 to decrease the pressure of the compressed air.

The pressure sensor 38 is coupled to air pump 37 to detect the pressure of the compressed air issued from the air pump 37. As hereinbefore described, the signal from the pressure sensor 38 which is indicative of the pressure of the compressed air issued from the air pump 37 is, after having been amplified by the negative feed-back amplifier 39, fed back to the comparator 36 wherein it is compared with the velocity signal V for the purpose of pressure control. For example, if the value of the velocity signal V becomes high, the value of the output signal from the pressure sensor 38 at this moment becomes lower than the value of the velocity signal V and, therefore, the comparator 36 generates the difference signal for supply to the control circuit 40 which in turn generates the control signal CW to the drive circuit 41. The consequence is that the compressed air source 42 is caused to operate to increase the pressure of the compressed air fed to the ink tank 14.

It is to be noted that the intelligence signal applied from, for example, the computer, to the interface 22 includes, in addition to an X-Y servo-control signal providing respective bases for the positioning signals Sx and Sy, an ink jet trigger signal Sd. This ink jet trigger signal Sd is ultimately used for initiating and interrupting an ink jet from the nozzle 15 towards the recording medium 21 in synchronism with the X-Y servo-control described above and is first applied to the interface 31. It is further to be noted that this ink jet trigger signal Sd functionally corresponds to a command signal, utilized in an X-Y plotter of the contact recording type wherein a recording pen is utilized, for engaging and disengaging the tip of the recording pen to and from the recording medium. As shown in FIG. 17, the ink jet trigger signal Sd is, after having been passed through the interface 31, applied to a high voltage pulse generator 50, only when the necessity arises, to cause the latter to apply a high voltage switching signal to the nozzle 15 of the ink jet generating unit 13, the consequence of which is generation of an ink jet directed from the nozzle 15 onto the recording medium 21.

Figure 19:
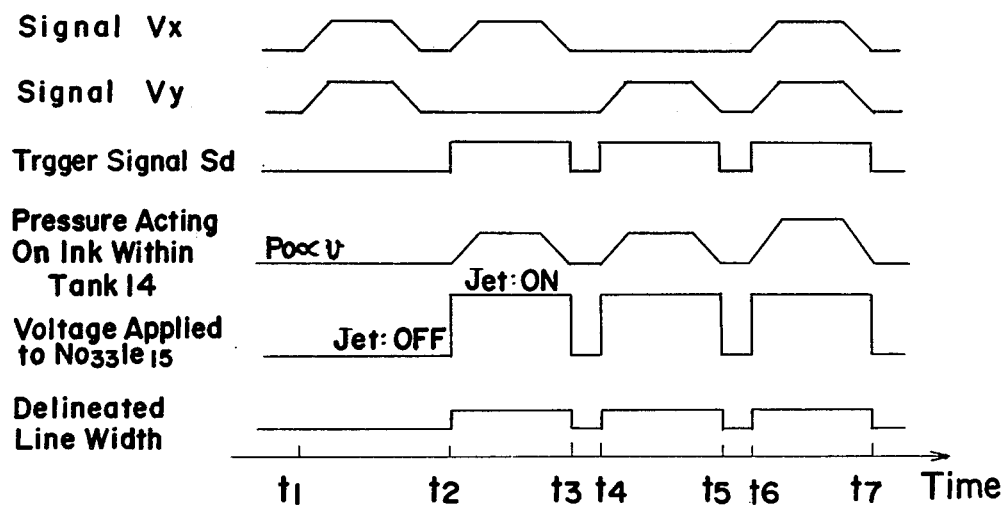
FIG. 19 is a chart showing various waveforms of signals appearing in the circuits of FIGS. 16 to 18.

FIG. 19 is a chart showing the relationship a with respect to time, among the signals Vx, Vy and V, the pressure P acting on the ink surface within the tank 14, the voltage Vj applied to the nozzle 15, the width of the resultant line delineated by the ink jet generating unit 13 and the trigger signal Sd. In the graph of FIG. 19, during a period from the moment $t_1$ to the moment $t_2$, the recording head 12 is moved without the ink jet being generated from the nozzle 15. In other words, during this period $t_1$ to $t_2$, since the trigger signal Sd is not yet supplied even though the positioning signals Vx and Vy are being issued from the interface 31, neither the pressure P nor the voltage Vj are respectively applied to the ink surface within the tank 14 and the nozzle 15. During a period from the moment $t_2$ to the moment $t_3$, the recording head 12 is moved in the direction parallel to the X-axis and, during a period from the moment $t_4$ to the moment $t_5$, the recording heat 12 is moved in the direction parallel to the Y-axis. However, during the respective periods $t_2$ to $t_3$ and $t_4$ to $t_5$, the recording operation is performed by jetting of the ink. It is to be noted that the recording velocity during the period $t_2$ to $t_3$ is equal to that during the period $t_4$ and $t_5$.

During a period from the moment $t_6$ to the moment $t_7$, the recording head 12 is moved simultaneously in the X-axis and Y-axis directions and, therefore, the recording velocity is higher than that during the period $t_2$ to $t_3$ and also that during the period $t_4$ to $t_5$. Under this condition, the velocity signal V and the pressure P acting on the ink surface within the ink tank 14 must accordingly be higher than that during either of the periods $t_2$ to $t_3$ and $t_4$ to $t_5$ and, by making the pressure higher, the resultant line delineated on the recording medium 21 has a uniform width.

From the chart of FIG. 19, it is clear that, when the intelligence signal is entered into the interface 22, the X-Y servo-control mechanism, the circuit diagram of which is shown in FIG. 16, is operated to move the recording head 12 to a definite position relative to the recording medium 21. Upon subsequent entry of the trigger signal Sd, a jet of ink is produced from the nozzle 15 by the application of the high voltage Vj to the nozzle 15 on one hand and the pressure of the compressed air appropriate to the recording velocity V is applied to the ink surface within the tank 14 on the other hand. Accordingly, the resultant line delineated by the ink jet from the nozzle 15 is uniform in width irrespective of the recording velocity V and continuation and interruption of the ink jet issuing from the nozzle 15 satisfactorily follows the trigger signal Sd. Repeated cycles of issuance and interruption of the ink jet issuing from the nozzle 15 can be rapidly performed by application of a switching voltage in accordance with the intelligence signal while a bias voltage is applied between the nozzle and an acceleration electrode.

Figure 20:
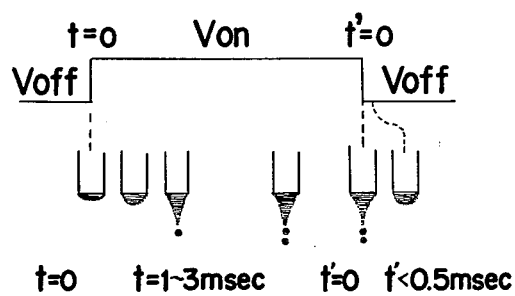
FIG. 20 is a schematic diagram showing how a meniscus of ink at the nozzle tip is transformed into a jet of fine ink droplets in relation to the voltage applied between the nozzle and the electrode.

FIG. 20 illustrates the sequence of formation of a jet of ink droplets which is produced by applying a bias voltage of 800 volts from the source 30 of bias voltage to the ink jet generating unit to form a meniscus of ink at the tip of the nozzle 15 and by subsequently applying a switching voltage of 1,000 volts from the high voltage pulse generator 50, which switching voltage is superimposed on the bias voltage, while the pressure acting on the ink surface within the ink tank 14 is maintained at a constant value equal to the atmospheric pressure. It has been found that the meniscus at the tip of the nozzle 15 responded in 1 to 3 milliseconds to the application of the switching voltage to transform the meniscus into a jet of droplets and the jet of droplets drawn from the nozzle 15 towards the recording medium 21 was interrupted in 0.5 millisecond subsequent to interuption of the supply of the switching voltage. In view of the above, the recording apparatus of the present invention can be satisfactorily employed in an X-Y plotter due to a quicker responsiveness than that of a conventional recording apparatus of the contact recording type utilizing, for example, a recording pen.

Figure 21:
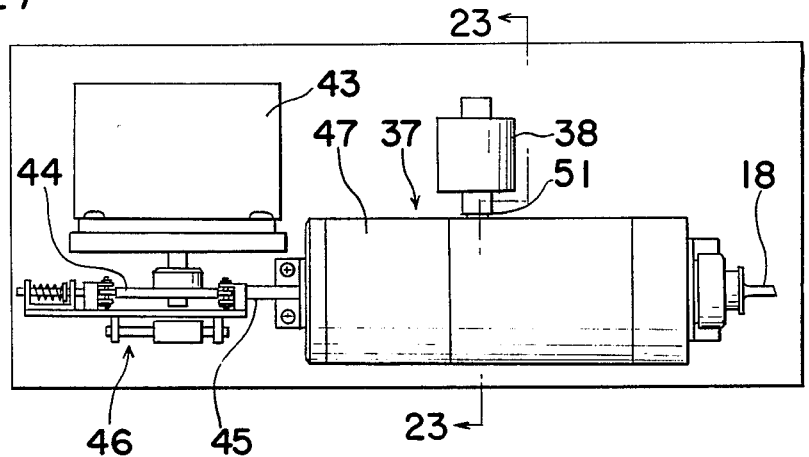
FIG. 21 is a schematic top plan view of a compressed air source.
Figure 23:
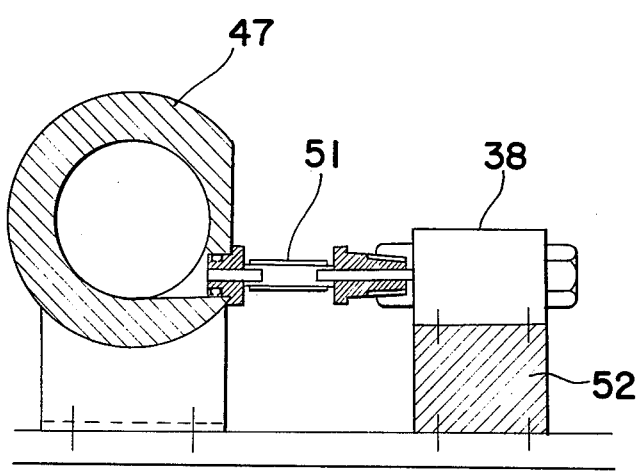
FIG. 23 is a end sectional view of the compressed air source taken on line 23—23 of FIG. 21 showing a preferred manner in which a temperature sensor is supported.

The details of the compressed air source 42 referred to above in connection with FIG. 17 will now be described with particular reference to FIGS. 21 and 23. As hereinbefore described, the compressed air source 42 includes the pulse motor 43 operable in response to the output from the drive circuit 41. In addition to the pulse motor 43, the compressed air source further includes a motion translator 46, composed of a rotary cam 44 rigidly mounted on the drive shaft of the pulse motor 43 and a piston rod 45 operatively coupled to said cam 44, for translating the rotary motion of the drive shaft of the motor 43 into a linear motion of the piston rod 45. A piston 48 is rigidly mounted on one end of the piston rod 45 remote from the rotary cam 44 and is reciprocally slidably housed within a cylinder 47. The air pump 37 forming a part of the compressed air source 42 is constituted by a diaphragm member 49 having an outer periphery secured to the cylinder 47 and a central portion secured to the piston 48 and so disposed as to divide the interior of the cylinder 47 into first and second working chambers 47a and 47b, the first working chamber 47a accommodating therein the piston 48. The pressure sensor 38 is disposed adjacent the cylinder 47 in position to detect variation in pressure within the second working chamber 47b in the cylinder 47, which sensor 38 generates the electric signal indicative of the pressure of the compressed air to be fed, or being fed, to the ink tank 14 through the flexible tube 18 having one end coupled to the cylinder 47 in communication with the second working chamber 47b and the other end coupled to the ink tank 14 in the manner as hereinbefore described.

The compressed air source 42 having the construction as hereinbefore described is so designed as to operate in response to the negative feed-back system wherein the electrical signal issuing from the pressure sensor 38 and indicative of the pressure of the compressed air fed to the ink tank 14 is, after having been amplified by the negative feed-back amplifier 39, compared with the velocity signal V in the analog comparator 36.

With the compressed air source 42 so constructed as hereinbefore described, it has been found that the compressed air pressure required in practice in order for the amount of ink jetted to substantially correspond to the recording velocity as shown in the graph of FIG. 14 shall be controlled to be in the range of 40 to 60 cmAq. Therefore, it can be concluded that the maximum amount of change in volume of the cylinder 47 resulting from movement of the piston 48 within the cylinder 47 need not be more than one-tenth of the total volume of the cylinder 47. More particularly, assuming that the piston 48 is moving in a compression stroke, since the air within the cylinder 47 undergoes a polytropic change, the following equation can be established:

$$P_1 \cdot V_1^K = P_2 \cdot V_2^K \quad (1 < K < 1.4)$$

wherein $P_1$ and $V_1$ represent the pressure and volume of the air in the cylinder prior to being compressed, respectively, while $P_2$ and $V_2$ represent the pressure and volume of the air in the cylinder subsequent to being compressed after the piston has moved a distance $\delta l$. Assuming that $V_1 - V_2 = \delta V$ wherein $\delta V << V_1$, the value of $P_2$ can be expressed by the following equation:

$$P_2 = P_1(1 - \delta V/V_1)^{-K} \approx P_1(1 + K \cdot \delta V/V_1)$$

If the difference between the pressures $P_2$ and $P_1$ is expressed by $\delta P$, then, $\delta P = P_2 - P_1$ and, therefore, $$\delta P \approx \frac{KP_1}{V_1} \cdot \delta V$$

If the effective surface area of the diaphragm member 49 which receives the pressure is expressed by S, the following equation can be obtained:

$$\delta V = S \cdot \delta l$$

Accordingly, $$\delta P \approx \frac{K \cdot S \cdot P_1}{V_1} \cdot \delta l$$

Since $(K \cdot S \cdot P_1)/V_1$ is a constant, the quantity of change in pressure, that is, $\delta P$, is approximately proportional to the distance $\delta l$ of linear movement of the piston 48 during the compression stroke. Moreover, since the pressure detected by the pressure sensor 38 and the output voltage from the pressure sensor 38 exhibit a linear characteristic and since the cam 44 of the motion translator 46 is so designed as to make the relation between the angle of rotation of the pulse motor 43 and the stroke of movement of the piston a linear relationship, the compressed air source 42 can be linearly controlled.

The compressed air source having the construction as hereinbefore described is supported externally of the recording head 12 and is connected with the ink jet generating unit 13 through the flexible tube 18 extending between the cylinder 47 and the ink tank 14. Therefore, the recording head 12 for the support of the ink jet generating unit 13 can be assembled or manufactured in a compact size without requiring an increased weight. However, it is to be noted that, since the pressure sensor 38 tends to be unfavorably affected by vibrations which may occur during the movement of the recording head 12, the connection between the pressure sensor 38 and the cylinder 47 should be by means of a flexible tube 51 and the sensor 38 should be mounted on a base through a damping block 52 made of rubber material so that substantially no vibration will be transmitted to the pressure sensor 38, such as shown in FIG. 23.

Figure 24:
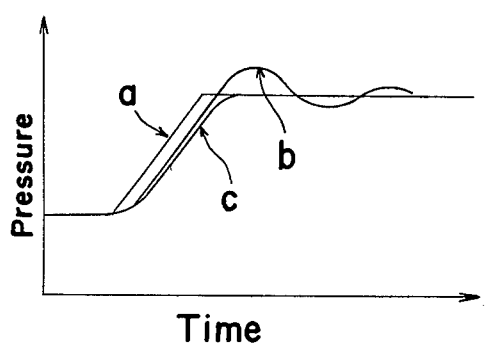
FIG. 24 is a graph showing the variation in pressure acting on the top surface of the ink within the ink tank.
Figure 25:
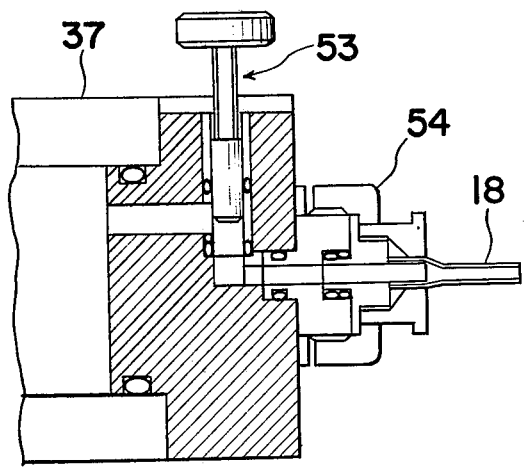
FIG. 25 is a schematic sectional view of a portion of the compressed air source showing an example wherein a pressure regulator is employed for adjusting the pressure of the compressed air supplied to the ink tank.

Preferably, the flexible tube 18 extending between the cylinder 47 and the ink tank 14 has the smallest possible inner diameter, for example, 1 to 2 mm., so as to avoid any possible adverse influence on the compressed air source system. More specifically, if the inner diameter of the flexible tube 18 employed is relatively large, intrinsic vibration of an air column determined by the distance between the diaphragm member within the cylinder and the ink surface within the ink tank 14 (which distance may be 3 to 5 meters in a large-sized drawing machine), such as shown by the curve b in a graph of FIG. 24, acts on the ink surface within the ink tank 14, so that a change in pressure of the compressed air within the cylinder, such as shown by a curve a in the graph of FIG. 24, is not accurately transmitted to the ink surface within the ink tank 14. The consequence is that a close speed control will not be achieved. In view of the above, if the inner diameter of the tube 18 is made as small as possible, the undesirable influence of the intrinsic vibration can be minimized. It is to be noted that, if a needle valve 53 is provided for manually adjusting the cross sectional area of the passage for the flow of the compressed air thereby adjusting the resistance to the flow of the compressed air such as shown in FIG. 25, the pressure acting on the ink surface within the ink tank 14 will be as represented by the curve c in the graph of FIG. 24 which contains no vibration component. The employment of the needle valve 53 has been developed to take advantage of the fact that flow of air within a pipe is often affected by the resistance due to the design of the pipe to the flow of the air and, therefore, by adequately adjusting the needle valve 53, unwanted vibration can be substantially eliminated.

In the X-Y plotter utilizing the ink jet recording apparatus embodying the present invention, it is possible to cause the ink jet generating unit 13 to delineate lines of different widths with only a single nozzle. In order to achieve this, it is necessary to make the pressure of the compressed air, which is applied to the ink surface within the ink tank 14, adjustable. This can be accomplished by adjusting the amplification gain of either the velocity signal V or the pressure signal indicative of the compressed air pressure prior to applying the velocity signal V or the pressure signal to the analog comparator 36. This will now be described with reference to FIG. 26 and FIG. 27.

Figure 26:
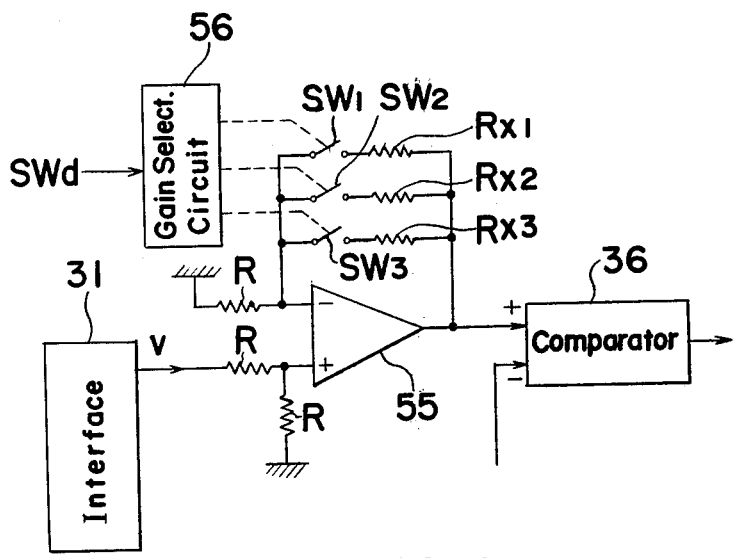
FIG. 26 is a circuit diagram showing a gain control circuitry which may be employed in the circuitry of FIG. 17.

Referring now to FIG. 26, there is illustrated a circuit which can adjust the amplification gain of the velocity signal V from the interface 31 to the comparator 36. As shown, prior to the application of the velocity signal V to the comparator 36, the velocity signal V is applied to a positive phase amplifier 55. The positive terminal of the positive phase amplifier 55 is connected to the interface 31 through a resistor R, and the negative terminal of the amplifier 55 is grounded through a resistor R on one hand and connected to the comparator 36 through a parallel circuit including a plurality of, for example, three, feed-back resistors $Rx_1$, $Rx_2$ and $Rx_3$ and associated selector switches $SW_1$, $SW_2$ and $SW_3$ which are respectively connected in series with the feed-back resistors $Rx_1$, $Rx_2$ and $Rx_3$.

Since the voltage gain of the positive phase amplifier 55 is determined by $(R+Rxn)/2R$, the desired voltage gain can be achieved by closing any one of the selector switches $SW_1$, $SW_2$ and $SW_3$ to complete a feed-back circuit between the output of the amplifier to the negative terminal of the amplifier 55 through one of the resistors $Rx_1$, $Rx_2$ and $Rx_3$ which is connected in series with the switch $SW_1$, $SW_2$ or $SW_3$ which is closed. For selectively closing one of the selector switches $SW_1$, $SW_2$ and $SW_3$, a line width selection signal Swd is applied from an external circuit to a gain selection circuit 56 which is in turn connected to the selector switches $SW_1$, $SW_2$ and $SW_3$ so as to selectively close any one of these selector switches depending on the contents of the line width selection signal Swd. Specifically, where a line of a relatively large width is desired to be delineated on the recording medium 21, one of the selector switches $SW_1$, $SW_2$ and $SW_3$, the closure of which causes an increase of the gain of the positive phase amplifier 55, is closed to complete the feed-back loop through the associated resistor $Rx_1$, $Rx_2$ or $Rx_3$. In this case, the velocity signal V is, after having been amplified to represent a higher recording velocity than the actual recording velocity, applied to the comparator 36 through the positive phase amplifier, the consequence of which is that the compressed air pressure is so increased that the line of relatively large width can be delineated by the ink jet generating unit 13 on the recording medium 21.

Where the recording velocity is variable, the arrangement may be such that the velocity signal indicative of the actual recording velocity is varied by the line width selection signal Swd, which is in turn amplified by the gain selector circuit 56 prior to being applied to the comparator 36. In other words, in the circuit of FIG. 26, the velocity signal available when the recording velocity is constant has been described as being applied to the comparator 36 while the gain of the amplifier 55 is varied. Accordingly, at the time a line of relatively large width, that is, a bold line, is desired to be delineated on the recording medium with respect to a certain velocity signal $v_a$, the input signal $v_b$ applied to the comparator 36 has a relation expressed by $v_a < v_b$. It is assumed that the actual recording velocity at this time is Va. If the actual recording velocity is increased to a value Vb which is higher than the value Va, the velocity signal now represents the recording velocity $v_b$. If this velocity signal indicative of the recording velocity Vb is decreased to the value $v_a$ by the amplifier and, then, applied to the comparator 36, since the value Vb is higher than the value Va, the width of the resultant delineated line can be increased in a similar manner as hereinbefore described.

Summarizing the foregoing, the following table can be obtained.

|  | Actual Recording Velocity | Velocity Signal | Velocity Signal Emerging from Gain Selector |  | Line Width |
| --- | --- | --- | --- | --- | --- |
| Method of Fig. 16 | Va | $v_a$ |  | $v_a$ | Fixed |
| Method of Fig. 26 | Va | $v_a$ | $v_b$ | $v_b > v_a$ | Bold |
|  |  |  |  | $v_b < v_a$ | Fine |
| Modified |  |  |  | Vb < Va | Bold |
| Method of Fig. 26 | Vb | $v_b$ | $v_a$ | Vb > Va | Bold |
|  |  |  |  | Vb > Va | Fine |

Figure 27:
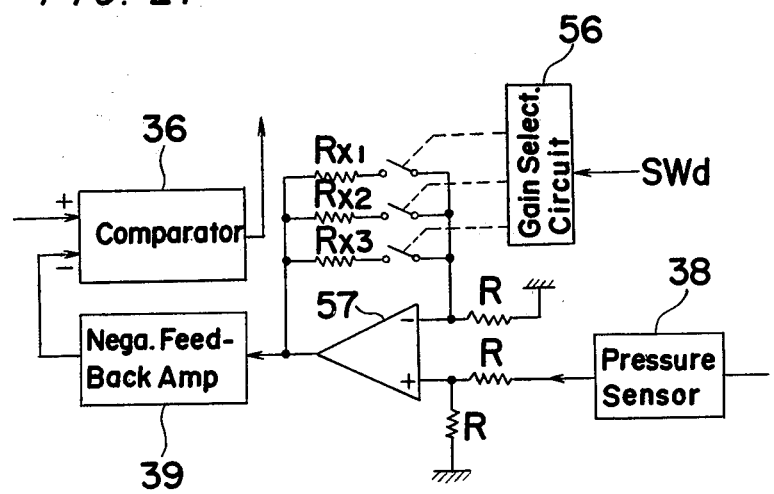
FIG. 27 is a circuit diagram showing a modification of the gain control circuitry shown in FIG. 26.

Referring to FIG. 27, there is illustrated a circuit for adjusting the amplification gain of the pressure signal supplied from the pressure sensor 38 to the comparator 36. The circuit shown in FIG. 27 is constituted by components similar to those employed in the circuit of FIG. 26 and is operable in a substantially similar manner to the circuit of FIG. 26 except for a difference in performance is that, whereas in the circuit of FIG. 26 the voltage gain is increased when a bold line is desired to be delineated, in the circuit of FIG. 27 the voltage gain of the amplifier 57 is descreased where a bold line is desired to be delineated.

In either of the circuits of FIGS. 26 and 27, it is to be noted that, although circuit has been described as employing the separate, parallel-connected resistors Rx$_1$, Rx$_2$ and Rx$_3$ for selectively varying the amplification gain of the amplifier 55 or 57, a single variable resistor may be employed in place of the separate resistor, in which case the width of the line to be delineated can be varied.

Instead of employing an electrical circuit, such as shown in FIG. 26 or FIG. 27, for enabling the ink jet generating unit 13 to delineate line of different width according to a line width selection signal Swd, a mechanical means may be employed which will now be described with particular reference to FIGS. 28 and 29.

Figure 28:
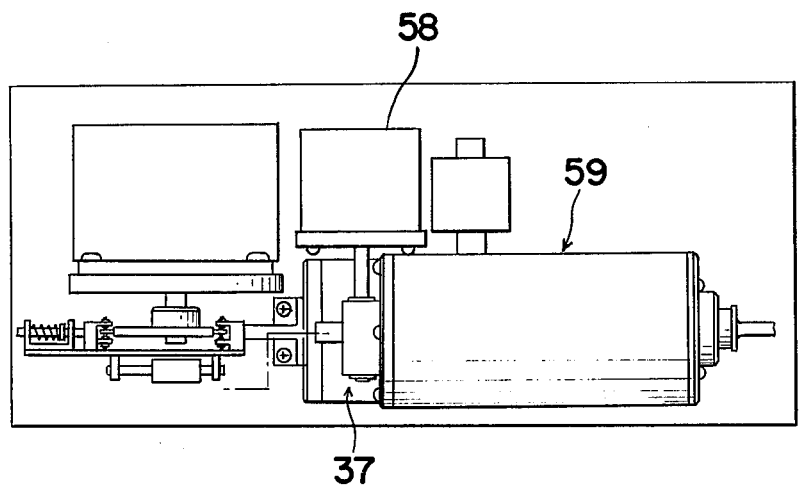
FIGS. 28 and 29 are views respectively similar to FIGS. 21 and 22, showing a modified form of the compressed air source.
Figure 29:
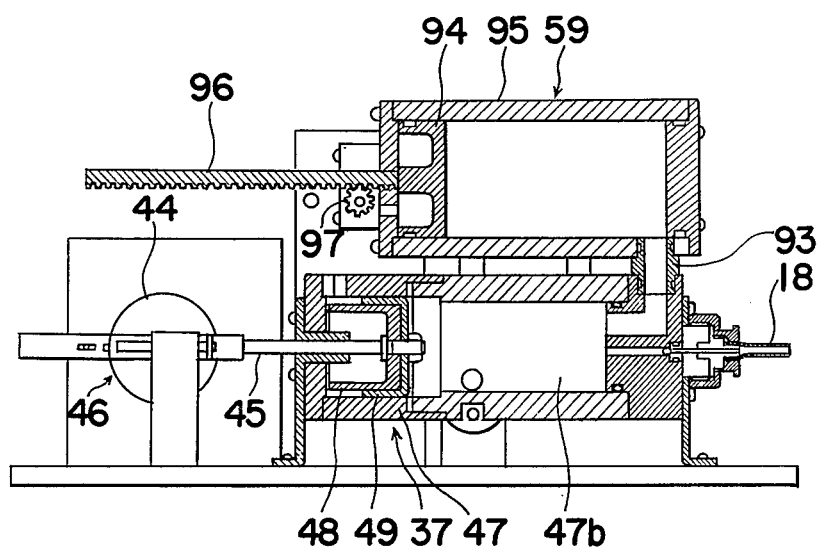

Referring now to FIGS. 28 and 29, there is shown an auxiliary pump 59 positioned adjacent and in parallel relation to the cylinder 47. This auxiliary pump 59 is constituted by a cylinder having a piston 94 reciprocally slidably accommodated within the interior of the cylinder. Extending externally of the cylinder 95 from the piston 94 is a rack 96 constantly engaged with a drive pinion 97 mounted on the drive shaft of a pulse motor 58, which pulse motor 58 can be energized by the line selection signal. The interior of the cylinder, the volume of which varies depending upon the position of the piston 94, is communicated to the working chamber 47b within the cylinder 47 by way of a connection pipe 93.

In the construction thus far described, it will readily be seen that stepwise rotation of the pulse motor 58 in response to the line width selection signal applied thereto results in correspondingly stepwise movement of the piston 94, the consequence of which is that the compressed air within the cylinder 95 is fed stepwise to the working chamber 47b. It is to be noted that the pulse motor 58 is energized only where a line of different width is desired to be delineated on the recording medium through the ink jet generating unit 13. On the other hand, the compressed air pump 37 is utilized only for the purpose of controlling the amount of the jetted ink in such a manner as to avoid any fluctuation thereof with respect to the recording velocity.

With the pressure control system shown in FIG. 17 wherein the negative feed-back control system is employed, the pressure sensor 38 employed is required to be of a type having a high sensitivity because the pressure acting on the ink, that is, the pressure to be controlled is usually at a low level, for example, 0 to 100 cmAq. Therefore, a semiconductor strain gauge may be employed for the pressure sensor. However, a pressure sensor utilizing a semiconductor strain gauge tends to have an inferior temperature characteristic and the output voltage available from such a pressure sensor is relatively low, for example, some ten millivolts. In view of this, where a pressure sensor utilizing a semiconductor strain gauge is employed, the negative feed-back amplifier must be of a type having a relatively high amplification factor. Thus, the use of a pressure sensor utilizing a semiconductor strain gauge not only causes a problem associated with the inferior temperature characteristic of the strain gauge, but also a problem associated with the requirement of high skill and expensive parts needed in the manufacture of the negative feed-back loop system.

On the other hand, the time during which the X-Y plotter is operated per drawing is usually short, for example, several minutes to some ten minutes in the case where it is used in making a drawing, and X-Y plotter will be satisfactory if it can be operated only for that time. Accordingly, so far as the above described time during which the X-Y plotter can be satisfactorily be operated is involved, any change in temperature will be no more than several degrees C. and, therefore, if the negative feed-back loop is designed as shown in either of FIGS. 30 and 31, any disturbance resulting from a change in temperature can advantageously be avoided.

Figure 30:
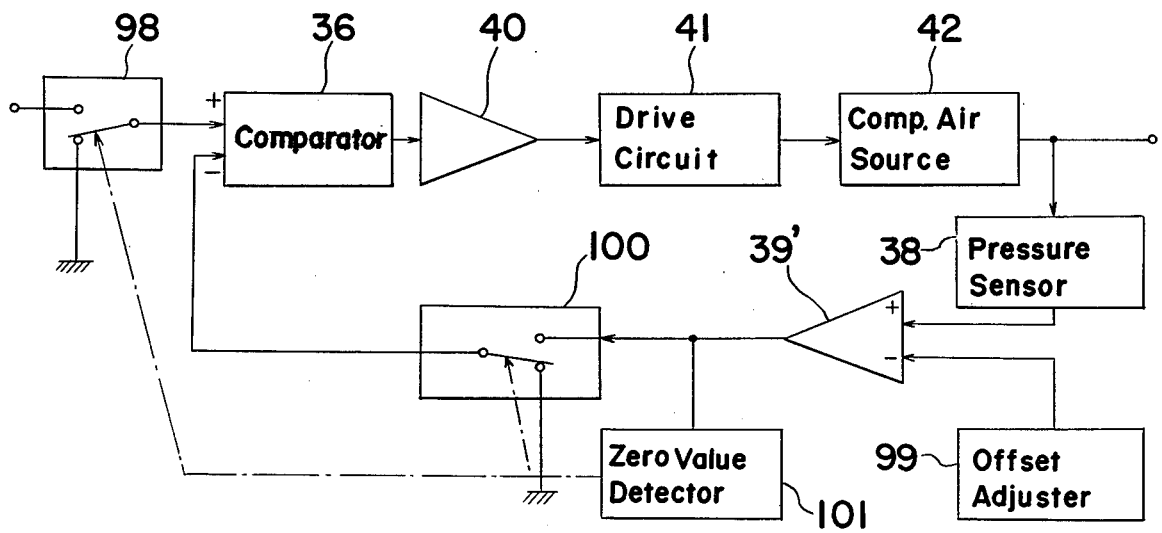
FIG. 30 is a block diagram showing a modified form of negative feed-back loop employed in the circuitry of FIG. 17.

Referring first to FIG. 30, the circuit shown in FIG. 17 is shown to have an input gate 98 inserted in a line which connects the interface 31 to the comparator 36 for supplying the velocity signal V. It is to be noted that the negative feed-back amplifier is, in the feed-back loop shown in FIG. 30, replaced by a differential amplifier 39'. The amplifier 39' has an output terminal connected to the comparator 36 through a feed-back gate 100, a positive input terminal connected to the pressure sensor 38 and a negative input terminal connected to an offset adjusting circuit 99. The output terminal of the differential amplifier 39' is also connected to a zero value detector 101 which is in turn mechanically coupled to the input gate 98 and also the feed-back gate 100, the output signal from the detector 101 being utilized as a switching control signal for the gates 98 and 100. It is to be noted that the amplifier 39' has a design wherein the level of the output generated by the amplifier 39' so long as the system is in a standstill position is zero. In order for an operator to be able to see whether or not the output level of the differential amplifier 39' is zero, the zero value detector 101 may includes a pilot lamp for the display of the output level of the amplifier 39'.

The operation of the system shown in FIG. 30 will now be described. Assuming that the compressed air source 42 is not operated and no compressed air is fed to the ink tank 14, if the output level of the amplifier 39' is not zero due to a drift occurring in either or both of the pressure sensor 38 and the amplifier 39' resulting from a temperature change, the zero value detector 101 generates a switching control signal by which the gates 98 and 100 are operated to complete a circuit between the ground and the positive terminal of the comparator 36 and also a circuit between the ground and the negative terminal of the comparator 36, respectively, as shown in FIG. 30, so that the supply of the velocity signal V to the comparator 36 is interrupted on one hand and the feed-back loop is isolated. At the same time, the pilot lamp may be lit by the output from the detector 101 to show that the output level of the amplifier 39' is not zero. When the operator, responding to the lighted pilot lamp, subsequently manipulates the offset adjusting circuit 99 so that the level of the input to the negative terminal of the amplfier 39' is adjusted sufficiently to cause the output level of the amplifier 39' to become zero, the detector 101 upon detection of the zero level output generates another switching control signal by which the gates 98 and 100 are again operated to complete a circuit between the interface 31 and the comparator 36 and also a circuit between the comparator 36 and the amplfier 39', respectively, on one hand and the pilot lamp is also extinguished to inform the operator that the output level of the amplifier 39' has become zero, in which condition the pressure control system employing the feed-back loop as shown in FIG. 30 operates in a manner similar to that shown in FIG. 17.

Figure 31:
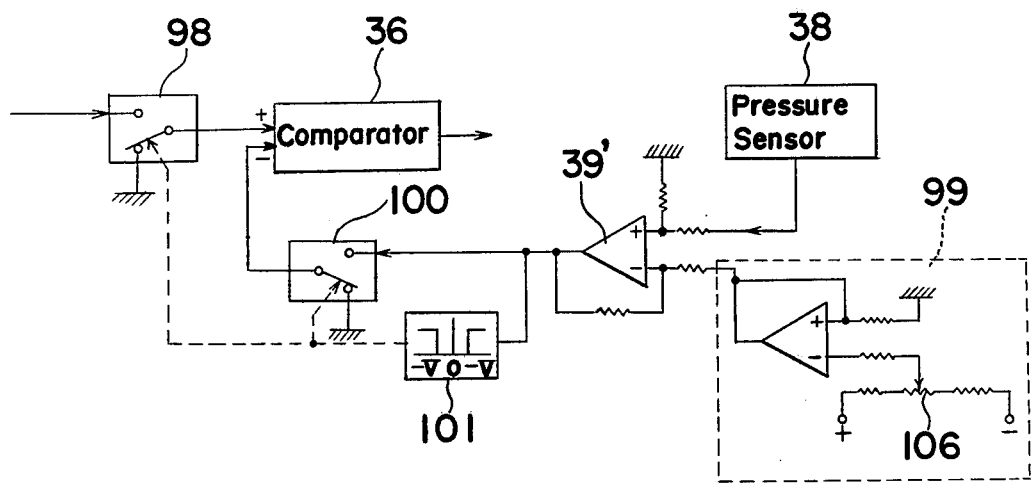
FIG. 31 is a circuit diagram showing the details of the modified negative feed-back loop shown in FIG. 30.

In practice, each of the gates 98 and 100 is preferably constituted by an analog switch operable by a digital signal (TTL level) which the offset adjusting circuit 99 is preferably constituted by a voltage follower having a positive input terminal connected to a manually adjustable potentiometer 106 as shown in FIG. 31. The zero value detector 101 is preferably constituted by a window comparator having a predetermined window width within the range of $\pm v_a$ volt which is sufficiently low as compared with the required control precision.

Figure 22:
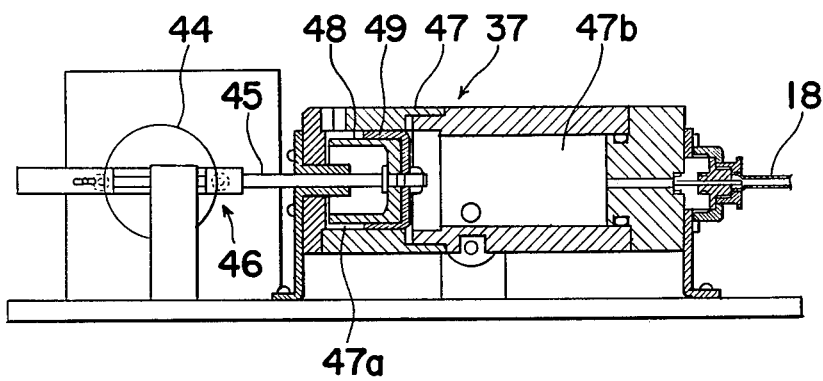
FIG. 22 is a side sectional view of the compressed air source shown in FIG. 22.

The operation of the pressure control system of FIG. 17 in which the feed-back loop of the circuit shown in FIG. 31 is employed will now be described. Prior to the X-Y plotter being operated, the cylinder working chamber 47b (FIG. 22) is communicated to the atmosphere through a normally opened, electromagnetically operated valve (not shown), which electromagnetically operated valve is subsequently closed when the X-Y plotter starts its operation, to confine the working chamber 47b within the cylinder 47. It is to be noted that, so long as the working chamber 47b is communicated to the atmosphere, the level of the input to the pressure sensor 38 is zero. If the output level of the differential amplifier 39' is within the range of $\pm v_a$ volt subsequent to the closure of the electromagnetically operated valve, the window comparator, that is, the detector 101, causes the analog switches, that is, the gates 98 and 100, to complete the circuit between the comparator 36 and the differential amplifier 39' and also the circuit between the interface 31 and the comparator 36, thereby causing the pressure control system to operate.

However, in the event that the output level of the amplifier 39' is outside the range of $\pm v_a$ volt, due to a temperature drift occurring in the pressure sensor 38 and the amplifier 39', although the input level of the pressure sensor 38 is still zero, the detector 101 causes the gates 98 and 100 to interrupt the supply of the velocity signal from the interface 31 to the comparator 36 and also to disconnect the feed-back loop as shown so that the pressure control system ceases its operation. This condition can be indicated to the operator by the pilot lamp. When the operator in response to the ignited pilot lamp manipulates the potentiometer 106 of the offset adjusting circuit 99 to set the output level of the amplifier 39' to a value equal to or less than $v_a$ volt, the detector 101 then causes the gates 98 and 100 to complete the circuit between the interface 31 and the comparator 36 and the circuit between the comparator 36 and the amplifier 39', thereby causing the pressure control system to operate.

In this manner, precise pressure control can be achieved during the operation of the X-Y plotter. Accordingly, during the time during which the X-Y plotter is operated, for example, some ten minutes, the pressure sensor can be satisfactorily be employed even if it is of a type having an inferior temperature dependence characteristic, substantially without requiring any expensive parts and without causing any substantial reduction in the overall performance of the pressure control system.

Figure 32:
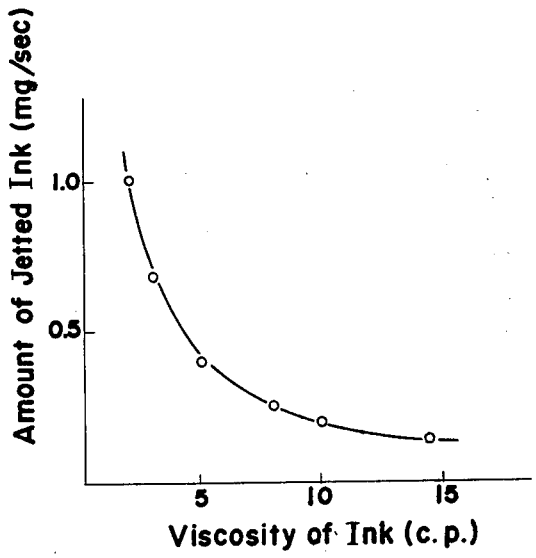
FIG. 32 is a graph showing the relationship between the amount of the ink jetted and the viscosity of the ink within the ink tank.

The ink jet generating unit 13 embodying the present invention may have a temperature compensation means for completely avoiding any possible variation in width of the line being drawn on the recording medium which may otherwise result from a change in the physical properties of the ink used under the influence of the ambient temperature. More specifically, it is well understood that the viscosity of the ink 17 within the ink tank 14 tends to be lowered with increase in the temperature of the ink used. As the viscosity of the ink used is lowered because of the increased temperature of the ink, the amount of the ink jetted from the nozzle 15 towards the recording medium 21 increases in inverse proportion to the decrease in viscosity of the ink as evidenced by the curve in the graph of FIG. 32. In view of this, even though the dimensions of the nozzle 15, the type of ink employed, the voltage applied between the nozzle 15 and the ring-shaped electrode 16 and the pressure applied on the ink surface within the ink tank 14 remain the same, it is apparent that, if the ambient temperature is reduced to such an extent that the viscosity of the ink employed is appreciably increased, the amount of ink jetted from the nozzle 15 onto the recording medium 21 will be correspondingly reduced and, if the ambient temperature is increased to such an extent that the viscosity of the ink employed is appreciably decreased, the amount of ink jetted from the nozzle 15 onto the recording medium 21 will be correspondingly increased. This means that the width of the line being delineated or drawn on the recording medium and the density of ink deposits forming such delineated line vary in proportional relation to the ambient temperature. The employment of the temperature compensation means referred to above can substantially eliminate the foregoing disadvantage and may be designed such as shown in FIG. 33 or FIG. 34.

Figure 33:
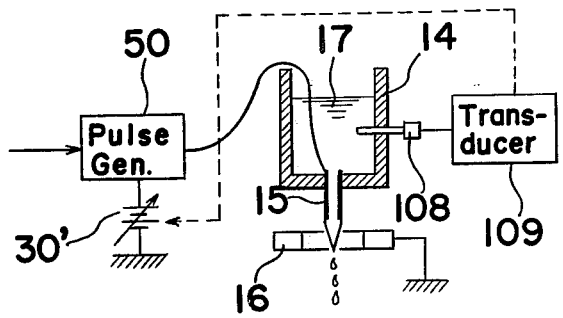
FIG. 33 is a schematic diagram showing the employment of a temperature compensating means which can be employed in the ink jet recording apparatus embodying the present invention.

Referring first to FIG. 33, the temperature compensating means is shown to comprise a transducer 109 including a temperature sensor 108 mounted on the ink tank 14 in position to detect the temperature of the ink 17 within the tank 14, said transducer 109 generating an electric signal indicative of the temperature of the ink 17 detected by the temperature sensor 108. The bias voltage source 30' employed in the example of FIG. 33 is of a type having a voltage regulator which is electrically coupled to the transducer 109 so that output voltage from the bias voltage source 30' can be adjusted in response to variation in temperature of the ink 17 within the ink tank 14. By way of example, the arrangement is such that, if the temperature of the ink 17 within the tank 14 is lowered, the voltage regulator in the bias voltage source 30' is operated to increase the output voltage from said source 30' and, if the temperature of the ink 17 becomes high, the voltage regulator in the bias voltage source 30' is operated to decrease the output voltage from said bias voltage source 30'. Therefore, it will readily be seen that, so long as the trigger signal applied to the high voltage pulse generator 50 is constant, the high voltage pulse generator 50 generates, in response to the output voltage from the bias voltage source 30', a high voltage pulse corresponding to the temperature of the ink 17 so that, irrespective of the temperature of the ink 17 within the ink tank 14, a substantially constant amount of ink will be jetted from the nozzle 15 towards the recording medium 21.

Figure 34:
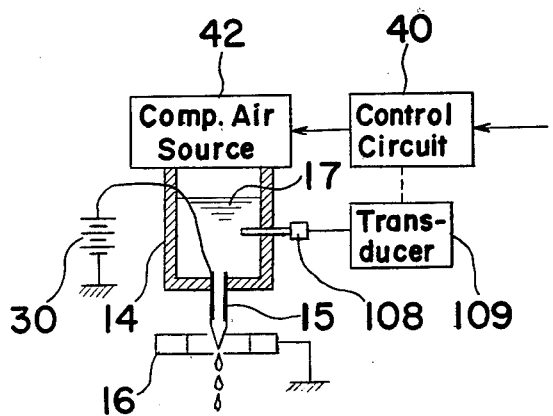
FIG. 34 is a diagram similar to FIG. 33, showing a modified form of the temperature compensating means shown in FIG. 33.

Referring now to FIG. 34, the output signal from the transducer 109, which is indicative of the temperature of the ink 17 within the tank 14, is applied to the control circuit 40 so that the bias level of the trigger signal emerging from the control circuit 40 is varied according to the temperature of the ink 17 within the ink tank 14 in such a manner that, when the temperature of the ink 17 is low, the compressed air source 42 is operated to increase the pressure of the compressed air being applied to the ink surface within the ink tank and, when the temperature of the ink 17 is high, the compressed air source 42 is operated to decrease the pressure of the compressed air being applied to the ink surface within the ink tank 14. Even with the circuit shown in FIG. 34, it is clear that, as long as the output signal from the comparator 36 being applied to the control circuit 40 remains constant, a substantially constant amount of ink will be jetted from the nozzle 15 towards the recording medium 21 irrespective of variation in temperature of the ink 17 within the inkk tank 14.

It is to be noted that the circuit shown in FIG. 33 may be combined with the circuit shown in FIG. 34. For example, in the circuit of FIG. 34, while the bias voltage source is employed in the form of a bias voltage source of a type having a voltage regulator such as shown in FIG. 33, the transducer 109 may be electrically connected not only to the control circuit 40, but also to the voltage regulator in the bias voltage source.

Furthermore, the ink jet recording apparatus of the present invention may have means for compensating for a reduction in the static pressure of the ink within the ink tank 14 resulting from consumption of the ink. As is well known to those skilled in the art, as the ink within the ink tank is consumed during the recording operation performed by the X-Y plotter, not only is the amount of ink jetted no longer proportional to the recording velocity, but also formation of ink droplets at the nozzle tip at the start of jetting thereof towards the recording medium is adversely affected.

The first mentioned problem may be negligible because the pressure acting on the ink surface is sufficiently higher than the static pressure due to the amount of ink within the ink tank. However, with respect to the second mentioned problem, because the pressure acting on the ink surace at the start of jetting of the ink from the nozzle tip is always zero, that is, equal to the atmospheric pressure acting on the nozzle tip, the static pressure of the ink within the ink tank tends to adversely affect the formation of the ink droplets to be jetted successively from the nozzle tip. More specifically, assuming that the ink tank contains a sufficient amount of ink, as shown in FIG. 35(A), a sufficient meniscus is first formed at the nozzle tip, as shown by (a), prior to the application of the switching voltage to the nozzle, which meniscus is subsequently transformed, as shown by (b), into a plurality of ink droplets directed towards the recording medium upon application of the switching voltage, a constant jetting of ink being, as shown by (c), established one to three milli-seconds subsequent to the application of the switching voltage.

Figure 35:
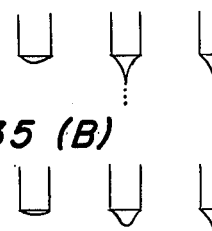
FIGS. 35(A) and (B) are diagrams illustrating how variation in static pressure of the ink within the ink tank affects formation of the jet of ink issued from the nozzle.
Figure 35:
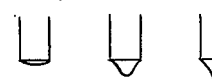

Contrary to the manner of formation of the ink jet as shown in FIG. 35(A), if the ink tank contains an insufficient amount of ink, the manner of formation of the ink jet tends to follow the sequence shown in FIG. 35(B). Referring now to FIG. 35(B), as shown by (a), an insufficient meniscus is first formed at the nozzle tip prior to the application of the switching voltage and, even though a sufficient meniscus is subsequently formed as shown by (b), it cannot be readily expelled from the nozzle tip upon application of the switching voltage or, if expelled, it tends to result in a jet of ink travelling along a path displaced from its normal course of travel.

In view of the above, the employment of the static pressure compensating means according to the present invention is advantageous in that the above described disadvantages can substantially be eliminated.

Where the static pressure compensating means is employed, it is necessary to detect any variation in the static pressure of the ink within the ink tank 14. This detection can be accomplished by detecting the angle of rotation of the drive shaft of the pulse motor 43 employed in the compressed air source 42. This is because the fact that the reduction of the amount of ink within the ink tank 14 correspondingly results in a reduction in static pressure as the air space above the ink surface within the ink tank increases even though the level of the velocity signal remains the same, and the angle of rotation of the drive shaft of the pulse motor 43 is increased in response to this reduction in static pressure of the ink within the ink tank 14 to cause the compressed air to be incrementally supplied to the ink tank so that the pressure proportional to the velocity signal can be applied to the ink surface of the ink within the ink tank 14. In other words, the ink jet recording apparatus of the present invention is designed such that the angle of rotation of the drive shaft of the pulse motor 43 gradually increases in response to consumption of the ink within the ink tank 14 so that a pressure proportional to the velocity signal is applied to the ink level surface so that the amount of ink appropriate and proportional to the recording velocity is jetted towards the recording medium. Therefore, it is clear that the angle of rotation of the drive shaft of the pulse motor 43 substantially corresponds to the reduction of the amount of the ink within the ink tank 14, that is, the reduction in static pressure on the ink within the ink tank 14.

Figure 36:
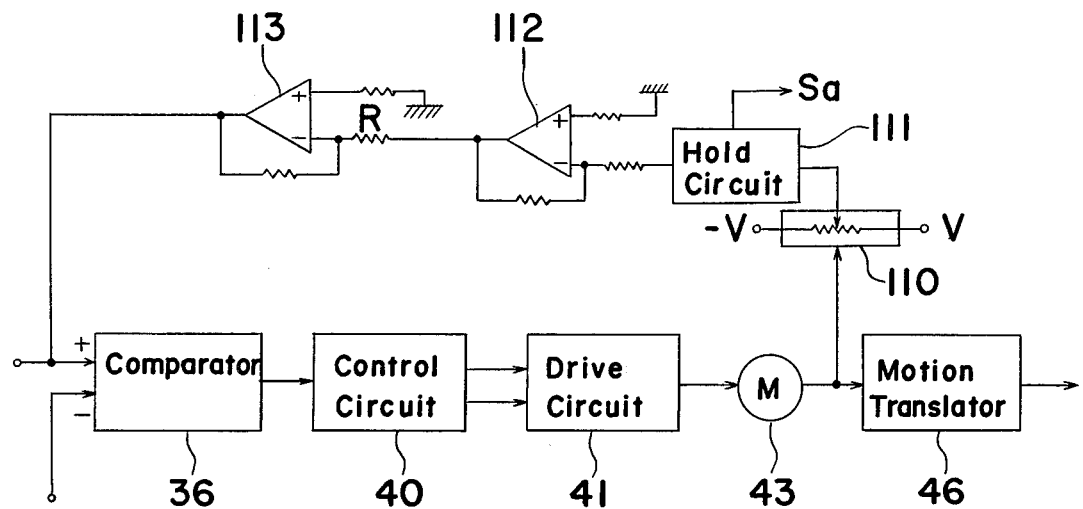
FIG. 36 is a circuit diagram showing a static pressure compensating means which can be employed in the ink jet recording apparatus embodying the present invention.

The static pressure compensating means shown in FIG. 36 comprises a potentiometer 110 operatively coupled to the pulse motor 43 for detecting the angle of rotation of the drive shaft of the pulse motor 43, a peak value hold circuit 111 for detecting and holding the peak value of the potentiometer 110, and inverting amplifier 112 for inverting and amplifying the output signal from the hold circuit 111, and a level shift circuit 113 operable by the inverted output from the inverting amplifier 112. The output signal from the level shift circuit 113 is applied to the analog comparator 36. The level shift circuit 113 is composed of a positive phase amplifier the voltage gain of which is one and the level of an output voltage from the circuit 113 is shifted by the output from the inverting amplifier 112. Detection of the angle of rotation of the drive shaft of the pulse motor 43 may be made in terms of a value relative to a certain reference signal indicative of the recording velocity and, therefore, in the circuit shown in FIG. 36, the angle of rotation of the drive shaft of the pulse motor is detected in terms of a value relative to the maximum recording velocity attainable by the ink jet recording unit 13. This is because, in the X-Y plotter, the maximum recording velocity is usually fixed.

The operation of the circuit shown in FIG. 36 will now be described.

Assuming that the static pressure of the ink within the ink tank 14 remains at a predetermined value, the level shift circuit 113 permits the passage of the velocity signal from the interface 31 to the comparator 36 so that the pulse motor 43 is rotated. The angle of rotation of the drive shaft of the pulse motor 43 being rotated is detected by the potentiometer 110, the output from said potentiometer 110 indicative of the angle of rotation of the drive shaft of the pulse motor 43 being detected and held in the peak value hold circuit 111. The output signal from the hold circuit 111 is, after having been inverted and amplified by the inverting amplifier 112, applied to the negative terminal of the level shift circuit 113. It is to be noted that the output voltage from the potentiometer 110 during this condition is such that the output from the inverting amplifier 112 is zero, that is, a ground potential.

If the static pressure of the ink 17 within the ink tank 14 is subsequently reduced with the consequent increase of the angle of rotation of the drive shaft of the pulse motor 43, the output voltage from the potentiometer 110 becomes high and, consequently, the output from the peak value hold circuit 111 correspondingly increases. The result is that the output level of the inverting amplifier 112 becomes negative, which is in turn applied to the level shift circuit 113. The level shift circuit 113 serves to shift the negative output level from the inverting amplifier 112 to a positive output level, the consequence of which is that the pulse motor 43 can be rotated further until the output voltage from the potentiometer 110 becomes high. Accordingly, the circuit including the potentiometer 110, the hold circuit 111, the inverting amplifier 112 and the level shift circuit 113 constitutes a positive feed-back loop and the position where the drive shaft of the pulse motor 43 is stopped can be determined in relation to the negative feed-back loop including the pressure sensor 38 and the feed-back amplifier 39. The gain of each of the positive and negative feed-back loops can be determined empirically. Furthermore, since the rate of reduction of the amount of the ink within the ink tank 14 is very low, the frequency characteristic, that is, the interrupting frequency, of the positive feed-back loop is preferably selected to be 1 Hz or less.

In the circuit shown in FIG. 36, the peak value hold circuit 111 may include a warning device for issuing a warning signal Sa indicative of the fact that substantially all the ink within the ink tank 14 has been consumed and the ink surface is positioned flush with or below the entrance leading into the nozzle, the generation of such warning signal Sa being by detecting the maximum possible angle of rotation of the drive shaft of the pulse motor 43.

Figure 37:
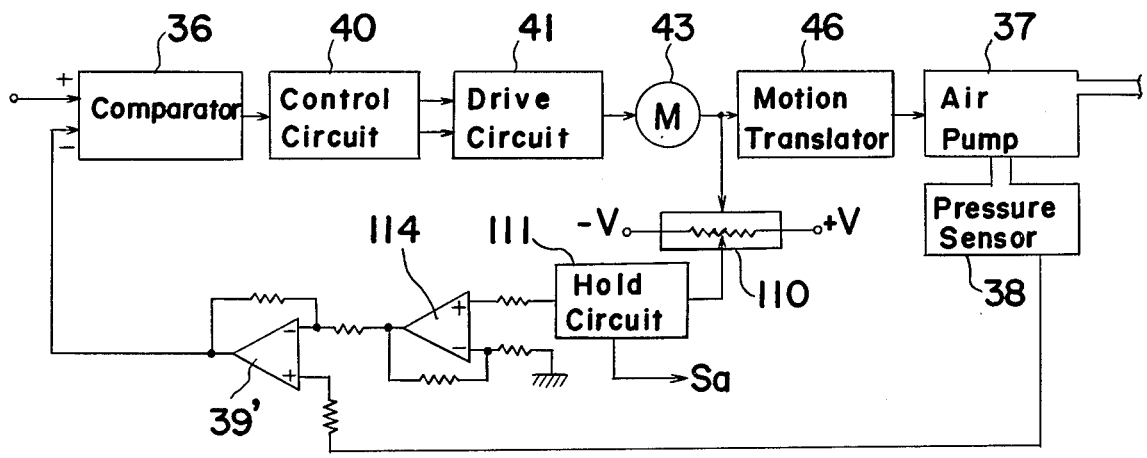
FIG. 37 is a diagram similar to FIG. 36, showing a modified form of the static pressure compensating means.

The circuit shown in FIG. 36 is such that a D.C. bias component of the velocity signal indicative of the recording velocity is modulated by the angle of rotation of the drive shaft of the pulse motor 43, which is indicative of the reduction in amount of the ink within the ink tank 14, to effect the static pressure compensation.

Where the feed-back amplifier 39 employed in the circuit of FIG. 17 is replaced by a differential amplifier 39' having the positive input terminal connected to the pressure sensor 38, a series circuit including the potentiometer 110 and the peak value hold circuit 111 may be connected between the pulse motor 43 and the negative input terminal of the differential amplifier 39' through a positive phase amplifier 114, as shown in FIG. 37. In the circuit shown in FIG. 37, if the static pressure of the ink 17 within the ink tank 14 remains at the predetermined value, the level of the output from the positive phase amplifier 114 is zero, that is, a ground potential and, therefore, the output signal from the pressure sensor 38 is applied to the analog comparator 36 through the differential amplifier 39'. However, as the static pressure of the ink within the ink tank 14 decreases during consumption of the ink 17, the output from the peak value hold circuit 111 is increased and the level of the output from the positive phase amplifier 114 becomes positive. Since the positive output from the positive phase amplifier 114 is an inverted input signal to the differential amplifier 39', the level of the output from the pressure sensor 38 is, after having passed through the differential amplifier 39', lowered and, therefore, in a similar manner as with the circuit shown in FIG. 36, the pulse motor 43 is rotated in such a direction that the output from the potentiometer 110 is increased.

Furthermore, instead of the angle of rotation of the drive shaft of the pulse motor 43 being detected as a parameter indicative of reduction in static pressure of the ink within the ink tank 14, the time during which the recording operaton is performed may provide a similar parameter. Where the recording time or period is taken as a parameter indicative of reduction in static pressure of the ink within the ink tank 14, the circuit arrangement shown in FIG. 38 may advantageously be employed.

Figure 38:
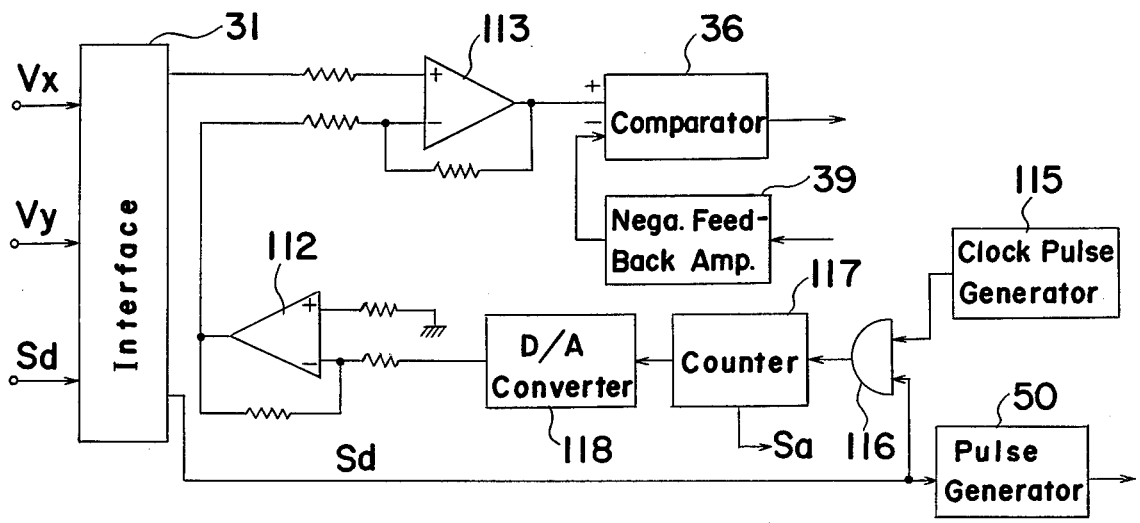
FIG. 38 is a diagram similar to FIG. 36, showing a further modified form of the static pressure compensating means.

Referring now to FIG. 38, the static pressure compensating means shown comprises a counter 117, the output of which is zero at the time the ink tank 14 contains a sufficient and predetermined amount of ink therein. The counter 117 is electrically connected to a digital-analog converter 118 which is in turn connected to the negative input terminal of the level shift circuit 113 through the inverting amplifier 112. As long as the output from the counter 117 remains zero, the output from either the converter 118 or the inverting amplifier 112 is equally zero, that is, a ground potential and, therefore, the velocity signal from the interface 31 is, without being level-shifted by the level shift circuit 113, applied to the analog comparator 36.

However, the pulse generator 50 upon receipt of the trigger signal Sd through the interface 31 applies the switching voltage to the nozzle 15 to initiate jetting of ink within the ink tank 14. When this continues for a substantial period of time, the ink level within the ink tank 14 is lowered due to the consumption of the ink 17 and there is an accompanying reduction in static pressure of the ink 17 within the ink tank 14. Since this reduction in static pressure of the ink within the ink tank 14 is, in the case where the amount of ink jetted remains the same, proportional to the time during which the trigger signal Sd is applied to the high voltage pulse generator 50, an AND gate 116 having separate input terminals to which the trigger signal Sd from the interface 31 and clock pulses from a clock pulse generator 115 are respectively applied is triggered on to allow the passage of the clock pulses therethrough to the counter 117 only during the duration of the trigger signal Sd, the clock pulses being, after having passed through the AND gate 116, counted by the counter 117. Therefore, it is clear that the output signal from the counter 117 is indicative of the recording time. The output signal indicative of the recording time is, after having been converted by the converter 118 and then inverted and amplified by the inverting amplifier 112, applied to the level shift circuit 113. The signal indicative of the recording time is, when applied to the level shift circuit 113, shifted to a positive level so that the pulse motor 43 can be rotated in such a direction that the amount of compressed air to be fed to the ink tank 14 can be increased.

In the circuit shown in FIG. 27, the warning signal Sd referred to above in connection with the circuit of FIG. 37 can be issued from the counter 117. Although any of the clock pulse generator 115, counter 117 and converter 118 may be of a type commercially available, a clock pulse generator capable of generating clock pulses the frequency of which is 0.1 Hz and a counter and converter having 12 bits are preferred.

With the static pressure compensating means shown in any one of FIGS. 36 to 38, although the recording time varies depending upon the volume of the ink tank 14 and/or the amount of ink jetted per unit time, it has been found that the recording time extends over about 3 hours according to an experiment wherein ink having a specific gravity of 0.9, charged into an ink tank having a volume of 5 ml., was jetted at a rate of 0.4 mg/sec. onto a recording medium while the recording velocity was 20 m/min. The 3 hours' recording time resulted in delineation of a line extending about 4 km.

In addition to the static pressure compensating means described above, the ink jet recording apparatus of the present invention may have means for compensating for variation in the amount of compressed air supplied into the ink tank 14, which variation may result from an increase in temperature of the compressed air being produced in the cylinder 47. As is well known to those skilled in the art, any machine when operated for a substantial period of time generates a heat energy and the ink jet recording apparatus of the present invention is no exception. Particularly, the cylinder 47 and the pulse motor 43 tend to generate heat during the continued operation of the apparatus, which heat energies is then transmitted to the compressed air being produced within the cylinder 47. With the temperature compensating means shown in FIGS. 39 and 40, even though the compressed air supplied to the ink tank 14 expands under the influence of the elevated temperature, undesired variation in pressure of the compressed air can advantageously be compensated for. This will now be described with reference to FIGS. 39 and 40.

Referring first to FIG. 39, the temperature compensating means shown in FIG. 39 is illustrated as combined with the static pressure compensating means shown in FIG. 36 and comprises a series circuit composed of a temperature sensor 119, positioned to detect the temperature within the cylinder of the air pump 37, such as a thermistor, a transducer 120 for converting the output from the temperature sensor 119 into an electric signal indicative of the temperature within the cylinder of the air pump 37 and an inverting amplifier 121 for inverting and amplifying the electrical signal from the transducer 120. This series circuit is connected to the inverting amplifier 112 and the output terminal of the amplifier 121 is connected to the positive input terminal of the amplifier 112.

The operation of the circuit shown in FIG. 39 will now be described. Assuming that the static pressure of the ink within the ink tank 14 remains at a predetermined value, the level shift circuit 113 permits the passage of the velocity signal from the interface 31 to the comparator 36 so that the pulse motor 43 can be rotated. The angle of rotation of the drive shaft of the pulse motor 43 being rotated is detected by the potentiometer 110, the output from said potentiometer 110 indicative of the angle of rotation of the drive shaft of the pulse motor 43 being detected and held in the peak value hold circuit 111. The output signal from the hold circuit 111 is, after having been inverted and amplified by the inverting amplifier 112, applied to the negative terminal of the level shift circuit 113. It is to be noted that the output voltage from the potentiometer 110 during this condition is such that the output from the inverting amplifier 112 is zero, that is, a ground potential.

If the static pressure of the ink 17 within the ink tank 14 is subsequently reduced with the consequent increase of the angle of rotation of the drive shaft of the pulse motor 43, the output voltage from the potentiometer 110 becomes high and, consequently, the output from the peak value hold circuit 111 correspondingly increases. The result is that the output level of the inverting amplifier 112 becomes negative, which is in turn applied to the level shift circuit 113. The level shift circuit 113 serves to shift the negative output level from the inverting amplifier 112 to a positive output level, the consequence of which is that the pulse motor 43 can be rotated further until the output voltage from the potentiometer 110 becomes high. Accordingly, the circuit including the potentiometer 110, the hold circuit 111, the inverting amplifier 112 and the level shift circuit 113 constitutes a positive feed-back loop and the position where the drive shaft of the pulse motor 43 is stopped can be determined in relation to the negative feed-back loop including the pressure sensor 38 and the feed-back amplifier 39. The gain of each of the positive and negative feed-back loops can be determined empirically. Furthermore, since the rate of reduction of the amount of the ink within the ink tank 14 is very low, the frequency characteristic, that is, the the interrupting frequency, of the positive feed-back loop is preferably selected to be 1 Hz or less.

Assuming now that the series circuit including the temperature sensor 119, the transducer and the inverting amplifier 121 is not provided, an increase in the temperature of the compressed air produced by the air pump 37 results in an increased pressure acting on the ink surface within the ink tank 14 from the pressure normally corresponding to the angle of rotation of the drive shaft of the pulse motor 43, the consequence of which is that the angle of rotation of the drive shaft of the pulse motor 43 is reduced by the operation of the negative feed-back loop for the detection of that pressure and there is no output from the inverting amplifier 112.

The series circuit shown in FIG. 39 serves to compensate therefor. In other words, in the event that the temperature of the compressed air being produced by the air pump 37 increases, the angle of rotation of the drive shaft of the pulse motor 43 is reduced by the operation of the negative feed-back loop, resulting in an increased level of the output from the inverting amplifier 112, as hereinbefore described. On the other hand, the series circuit including the inverting amplifier 121 then operates in such a manner that the inverting amplifier 112 generates an output, the level of which is decreased in proportion to the temperature detected by the temperature sensor 119 to an extent sufficient to compensate for the reduction in the output level of the inverting amplifier 112 which has occurred in the manner as hereinbefore described. Therefore, the output signal supplied from the inverting amplifier 112 to the level shift circuit 113 acts on the velocity signal supplied to the level shift circuit 113 so that the ink within the ink tank 14 will not be adversely affected by the compressed air having the increased temperature and the pulse motor 43 is rotated through an angle sufficient to compensate for the reduction in amount of the ink within the ink tank 14.

It is to be noted that the warning signal Sa as described in connection with the circuit of FIG. 36 is, in the circuit shown in FIG. 39, issued from the inverting amplifier 112.

Where the temperature compensating means is desired to be combined with the static pressure compensating means shown in FIG. 37, what is necessary is to connect the inverting amplifier 121 to the negative terminal of the positive phase amplifier 114 so that the output from the peak value hold circuit 111 can be temperature-compensated as shown in FIG. 40. The circuit shown in FIG. 40 functions in a substantially similar manner to the circuit shown in FIG. 39.

The ink tank 14 employed in the ink jet recording apparatus of the invention may have a stabilizer for substantially avoiding variation in static pressure of the ink resulting from wavy motion of the ink surface within the ink tank. As is well known to those skilled in the art, the ink jet recording apparatus when employed in the X-Y plotter is moved in all directions and, therefore, the ink within the ink tank 14 undergoes motion. This motion of the ink tends to cause variation in static pressure particularly when the ink surface within the ink tank 14 is disturbed, which in turn results in the recording apparatus delineating a line of varying width even through the overall amount of ink jetted remains the same throughout the recording operation.

The stabilizer used in the ink tank 14 according to the present invention substantially eliminates the influence of the motion of the ink within the ink tank 14 on the static pressure thereof.

Referring first to FIG. 41, the stabilizer is shown to be constituted by a wad 122 of metallic or plastic fibers accommodated within and, therefore, immersed in the ink within the ink tank 14. In the example shown in FIG. 42, the stabilizer is shown to be constituted by a plurality of metallic meshes 123 accommodated within the tank 14 and stacked one above the other.

FIG. 43 illustrates an example wherein the metallic meshes 123 shown in FIG. 42 are arranged within the ink tank 14 in equally spaced relation to each other.

It is to be noted that the stabilizer shown in any one of FIGS. 41 to 43 serves not only as means for stabilizing the body of ink within the ink tank 14 during movement of the ink jet generating unit 13, but also as a filter for preventing any solid foreign matter contained in the ink from entering the nozzle 15.

The stabilizer may be, as shown in FIG. 44, constituted by a float 124 having a shape similar to the cross sectional area of the ink chamber of the tank 14. Preferably, the float 124 is made of foamed polyethylene, cork or any other suitable material having a specific gravity less than that of the ink used.

By the employment of the stabilizer of the construction shown in any one of FIGS. 41 to 44, it has been found that the ink within the tank 14 and retained in position by the stablizer can be caused to withstand an acceleration of about 2G acting on the ink incident to movement of the ink jet generating unit 13 with no substantial wavy motion occurring therein. The fact that substantially no motion of the body of the ink within the ink tank 14 occur when the stabilizer is present has the effect that the jetting of ink from the nozzle 15 towards the recording medium is advantageously stablized so that a line of uniform width can be delineated on the recording medium.

Referring back to FIG. 1, either or both of the recording medium 21 and the support 20 for the support of the recording medium 21 thereon is, when employed in the X-Y plotter incorporating the recording apparatus of the present invention, preferably of a type having an electroconductive property. The reason for this will now be described.

In the case where the recording medium which is a synthetic resin sheet, for example, polyester film, having a relatively low electroconductivity on the order of $10_{14}\Omega$ surface resistance is used in combination with an ink which has an electrostatically chargeable property, since the ink jetted from the nozzle 15 constitutes a series of ink droplets each having an electrostatic charge thereon and travelling towards the recording medium, the fine ink droplets first deposited on the polyester film tend to interfere with or repel the fine ink droplets subsequently deposited on the same polyester film. The consequence is that one or more ink smears tend to be formed on the delineated line and/or that some of the ink droplets being jetted towards the polyester film tend to be electrostatically attracted back towards the grounded ring-shaped electrode 16, thereby soiling the electrode 16. This is because, since the polyester film or other recording medium having a low electroconductivity is used for the recording medium 21 in connection with the ink jet recording apparatus provided by the present invention, the potential charge on the fine ink droplets is not discharged or grounded.

Moreover, even though the recording medium 21 used has at least an appreciable electroconductivity, a similar phenomenon is liable to occur unless the flat support 20 for the support of the recording medium 21 is electroconductive. Specifically, in this case, the potential charge on the ink droplets is, when the ink droplets are deposited on the electroconductive recording medium, conducted to the electroconductive recording medium and remains without being discharged or grounded. The consequence is that the potential on the surface of the recording medium is increased to such an extend that the directionality of the ink droplets subsequently jetted may be adversely affected.

On the other hand, depending upon the purpose for which the recording medium on which information, such as a drawing, is desired to be delineated, the demand for the use of a sheet or film made of synthetic resin, such as polyester, polyethylene, polyamide; polyvinyl fluoride or a plastic material prepared from cellulose, has increased. Since the sheet or film of the type referred to above has a very low electroconductivity, for example, $10^{14}\Omega$ in terms of surface resistance, a fine line of uniform width can be delineated thereon only with difficulty, even though every component of the ink jet recording apparatus functions satisfactorily, for the reason which has been described hereinabove.

In order to make possible the use of such low electroconductive recording medium in connection with the ink jet recording apparatus, one or both of the methods, which respectively pertain to improvement in the recording medium and the support 20 for the support of the recording medium thereon, may be employed, which will now be described.

The method associated with the recording medium is the employment of a recording medium of a type;

(1) having one or both surfaces coated with a hydrophilic material, such as silicon oxide, a surface active agent or a powder of electroconductive material, or (2) having a surface active agent or a powder of electroconductive material admixed therein during the manufacture of the recording medium, or (3) having one or both surfaces vapour-plated with a metallic material such as Al, Cu, In$_2$O$_3$, Fe, Co, Ni, Ru, Rh, Rd, Os, Ir or Pt.

Examples of the surface active agents referred to above are anionic surfactants such as sulfonates, sulfates, and the other acid ester derivatives; nonionic surfactants such as an ether type surfactant, including ethoxylated alkylphenols, ethoxylated aliphatic alcohols and polyoxyalkylene oxide block copolymers, ester type surfactant, including polyoxyethylene fatty acid esters and carboxylic esters, amide type surfactants, including polyoxyethlene fatty acid amides, ether and ester type surfactants, including ethoxylated anhydrosorbitol esters and the like; cation surfactants such as alkyl guaternary ammonium salts, alkyl imidazolines, polyalkylene polyamine derivatives, and the other amine derivatives amphoteric surfactants such as betaines and polymer surfactant such as acuylic acid derivatives.

Examples of the powder of electroductive material referred to above are powdered argentum, powdered cuprum and carbon black.

Although the application of a surface active agent referred to above does not appear to impart an electroconductive property to the recording medium, the presence of the surface active agent in the recording medium causes the latter to be wetted, or to be able to absorb water from the air, to such an extent that the recording medium or at least one surface of the recording medium can be considered electroconductive. It should be noted that the terms "electroconductivity" and "electroconductive property" hereinabove and hereinafter used in connection with the recording medium thus treated are to be understood as meaning a reduction in resistance relative to the intrinsic resistance of the recording medium. By way of example, it has been found that the application of a hydrophilic material to one surface of a polyethylene sheet having a surface resistance of $10^{14}\Omega$ resulted in a reduction in the resistance to $10^7$ to $10^{10}\Omega$ and, therefore, the polyethylene sheet after having the hydrophilic material applied thereto can be considered electroconductive relative to its condition before the application of such hydrophilic material.

The other method associated with the support 20 is to make the support 20 substantially electroconductive. For this purpose, the support 20 may be made of any metallic material. However, where the use of metallic material as a material for the support 20 is undesirable, any of constructions shown in FIGS. 45 to 47 may be employed, which will now be described.

Figure 45:
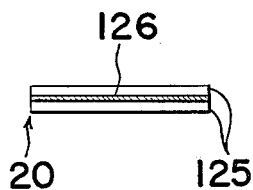
FIGS. 45 to 47 are sectional views of a support for supporting the recording medium, showing various forms of construction thereof according to the present invention.

Referring first to FIG. 45, the support 20 is shown to comprise a pair of rubber plies 125 stacked one above the other with a mesh of an electroconductive wire 126 sandwiched firmly therebetween. The electroconductive wire 126 sandwiched may be made of iron, copper or nicrome wire and is arranged in a mesh-like configuration. Where the nicrome wire is employed for the electroconductive wire 126, an additional advantage will be obtained if electric current is supplied through the electroconductive wire 126. This is because the flow of current through the wire 126 results in emission of heat from the wire 126 which is in turn transmitted through the upper rubber ply 125 to the recording medium so that ink deposits on the recording medium can readily be dried.

Figure 46:
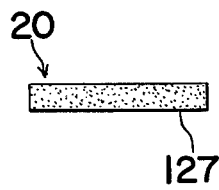

Referring to FIG. 46, the support 20 is shown to comprise a single rubber layer 127 having admixed therein a powdered electroconductive material, for example, carbon or silver, in an amount such that the elasticity of the rubber layer will not appreciably be destroyed. Preferably, the amount of the powdered electroconductive material is selected so as to give the support 20 a specific resistance not more than $10^5\Omega$.cm.

Figure 47:
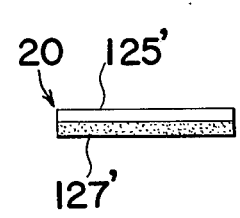

Referring to FIG. 47, the support 20 is shown to comprises an upper rubber layer 125' having an undersurface to which another rubber layer 127' having admixed therein a powdered electroconductive material, for example, carbon or silver, is bonded. The support 20 having construction shown in FIG. 47 may be considered a combined version of one of the rubber plies 125 of FIG. 45 and the rubber layer of FIG. 46. Where the support 20 of the construction shown in FIG. 47 is employed in the X-Y plotter, the support should be placed on the machine framework with the rubber layer 125' facing towards the ink jet generating unit 13.

The construction shown in either of FIGS. 45 and 47 is preferred where the powdered electroconductive material when admixed in the rubber layer tends to impart a colour other than white to the support whereas the support 20 is desired to be white.

Figure 48:
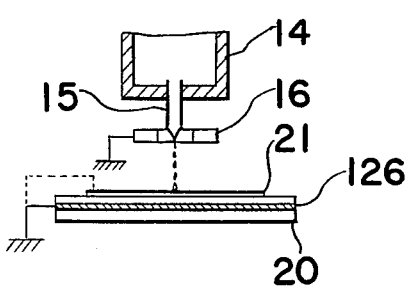
FIGS. 48 and 49 illustrate different manners of grounding the support.
Figure 49:
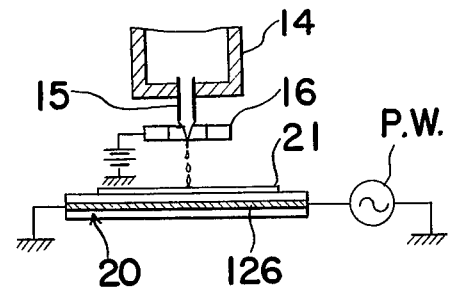

Irrespective of the construction of the support shown in FIGS. 45 to 47, where the potential evolved in the ink deposits is desired to be discharged only through the electroconductivity of the recording medium treated as hereinbefore described, it is necessary to connect the recording medium, supported on the support 20, to the ground by wiring such as shown by the chain line in FIG. 48. This can readily be achieved by placing one end of the grounded wire on the surface of the recording medium with or without the aid of a brush electrode or a weight held in contact with said surface of the recording medium.

Where the recording medium treated as hereinbefore described is combined with the support 20 having the construction shown in any one of FIGS. 45 to 47, one or both of the recording medium 21 and the support 20 may be electrically connected to the ground as shown in FIGS. 48 and 49. Referring to FIG. 48, there is shown a wire 126 in the form of a wire mesh sandwiched between the rubber plies 125 connected to the ground as shown by the solid line. Similarly, where the support 20 has the construction shown in either of FIGS. 46 and 47, the electroconductive rubber layer 127 or 127' should be connected to the ground. However, it should be noted that, where the support 20 is connected to the ground, a recording medium having a high insulating value, that is, which is not one of the above described types (1) to (3), may satisfactorily and effectively be employed. In other words, even though the recording medium which has not been treated to impart to it any electroconductive property is placed on the support 20, which is made of any metallic material or of the construction shown in any one of FIGS. 45 to 47 and which is, therefore, connected to the ground, discharge of the potential of the ink deposits to the ground can satisfactorily and effectively be achieved. This is substantially shown in FIG. 49.

In FIG. 49, while the insulating recording medium 21 is shown to be supported on the support 20 having the construction shown in FIG. 45, the wire 126 in the form of a wire mesh is shown to have one end connected to the ground and the other end connected to the ground through a heating power source P.W.

While in the example of FIG. 48 the ground potential should be equal to the potential supplied to the ring-shaped electrode 16, the ground potential in the example of FIG. 49 should be lower than the potential supplied to the ring-shaped electrode 16. The heating power source P.W. is preferably of a type capable of supplying a voltage not more than 50 volts so that the potential supplied from the power source P.W. to the wire 126 will not adversely affect the jet of ink being issued from the nozzle 15.

It should be noted that the arrangement shown in FIG. 49 is equally usable with a support 20 having construction shown in FIG. 46 or FIG. 47.

While the support 20 may be made of any metallic material as hereinbefore described, the use of rubber to form part or all of the support as shown in FIGS. 45 to 47 is preferred. This is because the support having construction shown in any one of FIGS. 45 to 47 can be used not only in an X-Y plotter utilizing the ink jet recording apparatus, but also in the conventional X-Y plotter utilizing a recording pen.

The X-Y plotter employing the ink jet recording apparatus according to the present invention may include a nozzle cleaning device having a construction which will be hereinafter described. As is well known to those skilled in the art, the ink used in the ink jet recording apparatus has a certain viscosity and, despite this fact, the ink of the type referred to above is required to have a quickdrying capability. Therefore, where the ink jet generating unit is not operated for a substantial period of time, there is the possibility that a portion of the ink within the ink tank 14 which remains within the nozzle 15 will dry up and clog the ink passage within the nozzle 15. If this actually happens, subsequent jetting of the ink from the ink tank 14 through the nozzle 15 will be adversely affected.

The above is true even where the recording apparatus includes a plurality of ink jet generating units each having a construction as hereinbefore fully described, for carrying out a multi-color recording operation wherein the ink jet generating units are brought into operation one at a time or for the purpose of delineating, one at a time, lines of different width by the selective use of the ink jet generating units.

The provision of the nozzle cleaning device referred to above is advantageous in that the above described disadvantages can be substantially eliminated. Cleaning of the clogged nozzle can be achieved by forcing ink within the nozzle to be jetted or discharged on a trial basis prior to an actual recording operation. In order that the trial jetting of the ink within the nozzle will not soil the recording medium, it is necessary to return or move the recording head to a predetermined position where the trial jetting of the ink is permitted. For this purpose, the nozzle cleaning device which will subsequently be described includes a return signal generating unit having a construction shown in FIG. 52.

Figure 51:
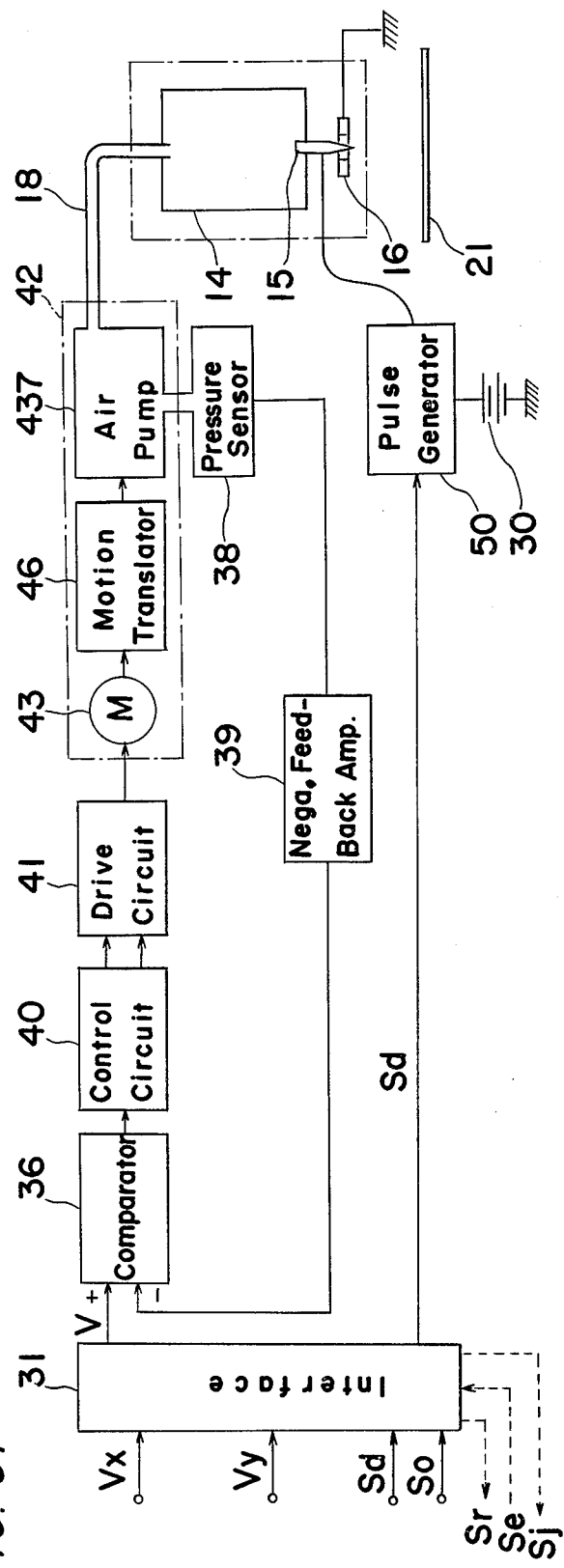
FIG. 51 is a diagram similar to FIG. 17, showing another embodiment of the circuiting ink jet for the recording apparatus of the present invention.

It is, however, to be noted that the nozzle cleaning device is included in the interface 31 of the circuitry for the ink jet recording apparatus of FIG. 51, which is similar to the circuit of FIG. 17.

Figure 50:
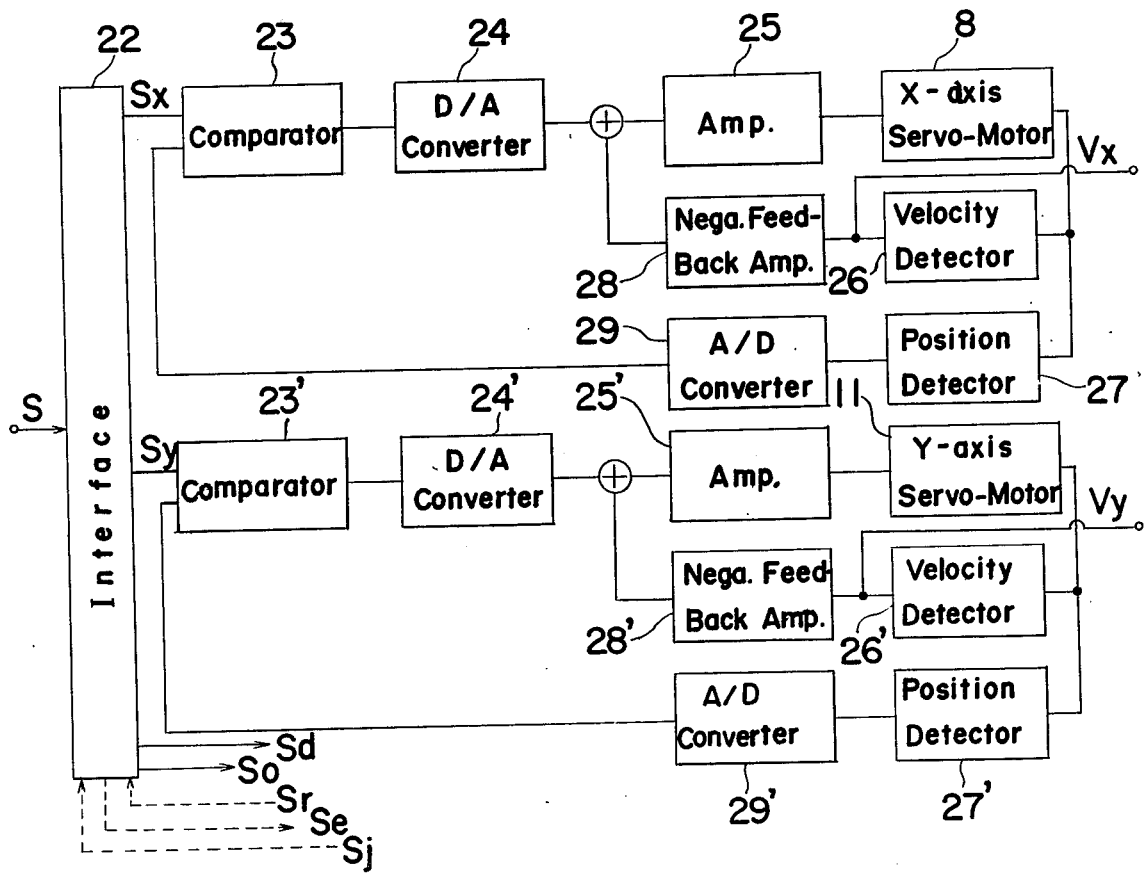
FIG. 50 is a diagram similar to FIG. 16, showing a different X-Y servo-control circuitry employed in the X-Y plotter.
Figure 52:
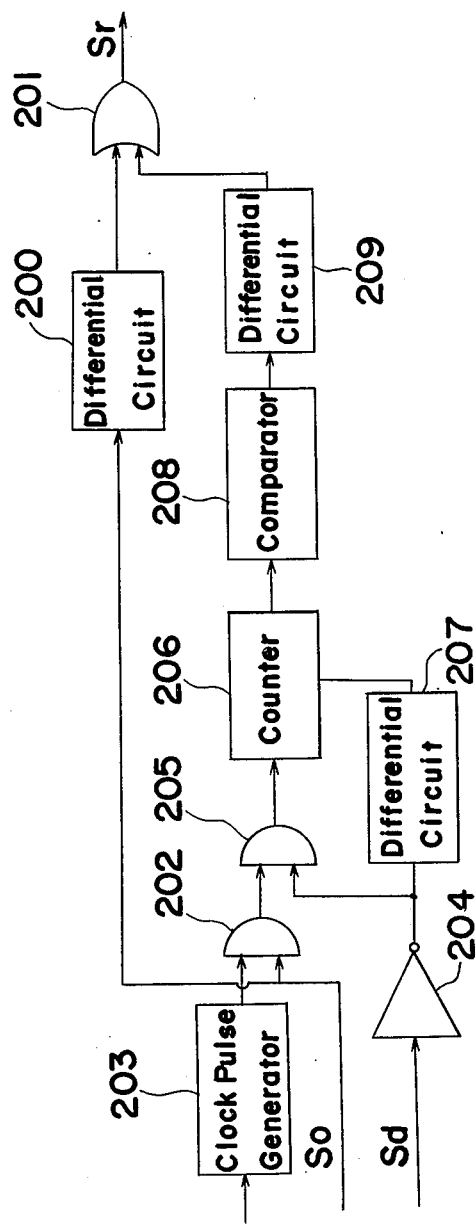
FIG. 52 is a return signal generating circuit forming part of the circuit shown in FIG. 51.

Referring now to FIG. 52, the return signal generating unit comprises a differential circuit 200 adapted to receive an initiating signal So which is generated from the interface 22 of the X-Y servo control circuitry of FIG. 50, which is the same as that of FIG. 16 with added means in the interface at the time the recording head 12 starts to move in readiness for an actual recording operation with the ink being jetted from the nozzle 15. The differential circuit 200 generates an output signal in response to the start of the initiating signal so applied thereto from the interface 22. The output signal from the differential circuit 200 is fed to an OR circuit 201.

The initiating signal is also applied to an AND gate 202 which passes clock pulses from a clock pulse generator 203 only during the duration of the initiating signal So. Assuming that the ink jet generating unit 13 is held at a standstill for a period of time longer than a predetermined time, in which condition no trigger signal Sd is generated from the interface 22 of the servo control circuitry of FIG. 50 not, therefore, supplied to a NOT circuit 204, an AND gate 205 to which the clock pulses emerging from the AND gate 202 are supplied is triggered on to pass such clock pulses to a counter 206. The counter 206, upon receipt of the clock pulses from the AND gate 205, starts counting the number of the clock pulses supplied thereto in synchronism with a switch-off of the trigger signal Sd. It is to be noted that the counter 206 can be reset to clear the contents stored therein by a reset signal which is generated from a differential circuit 207, for differentiating the start of the output from the NOT circuit 204, each time the trigger signal is switched off.

An output signal from the counter 206, which is indicative of the number of the clock pulses counted, is compared in a comparison circuit 208 with a reference value set in the comparison circuit 208. The comparison circuit 208, when the number of the clock pulses counted exceeds the predetermined number represented by the reference value set in the comparison circuit 208, generates an output signal which is supplied to a differential circuit 209. The output from the comparison circuit 208, after having been differentiated by the differential circuit 209 and after having subsequently been passed through the OR circuit 201, becomes the return signal Sr which is in turn applied to the interface 22 of the servo control circuitry of FIG. 50.

Upon receipt of the return signal Sr from the interface 31 of FIG. 51, the X-Y servo-control mechanism causes the recording head 12 to return or move to the predetermined position where no recording medium is present above the support 20 and generates an end signal Se which is supplied to the interface 31, which end signal Se is indicative of completion of the return movement of the recording head 12 to the predetermined position.

The nozzle cleaning device further includes a test signal generator electrically connected to the return signal generating unit, the construction of which test signal generating unit will now be described with reference to FIG. 53.

Figure 53:
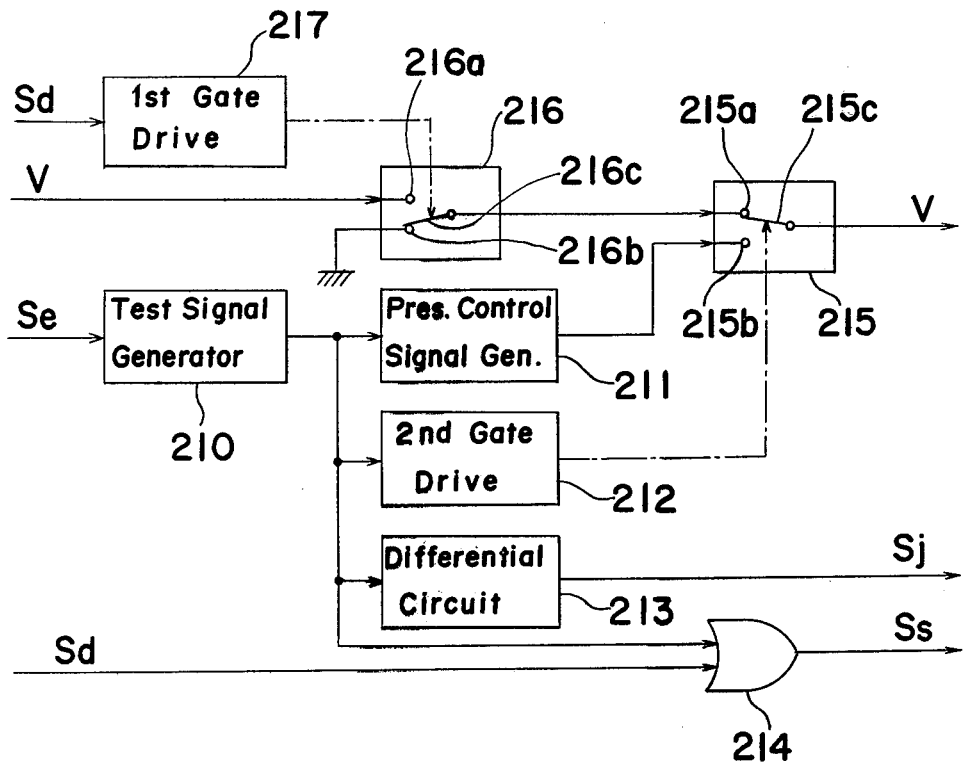
FIG. 53 is a block diagram showing a test signal generating circuit which can be employed in the ink jet recording apparatus of the present invention.

Referring to FIG. 53, the test signal generating unit, which is in interface 31, comprises a test signal generator 210 which, upon receipt of the end signal Se supplied from the X-Y servo control circuitry shown in FIG. 52, applies an output signal to a pressure control signal generator 211, a second gate drive circuit 212, a differential circuit 213 and an OR gate 214, all being electrically connected in parallel with to each other. The second gate drive circuit 212 is operatively associated with a second gate circuit 215 having a pair of fixed contacts 215a and 215b, contact 215a being electrically connected to a first gate circuit 216 which will be described later, and the contact 215b being electrically connected to an output terminal of the signal generator 211, and a movable contact 215c coupled to the second gate drive circuit 212 in such a manner that, during a period in which the output signal, that is, the test signal, is applied to the second gate drive circuit 212 from the test signal generator 210, the movable contact 215c is engaged with the fixed contact 215b to pass a pressure control signal from the generator 211 to the comparison circuit 36 (FIG. 51). This pressure control signal from the generator 211 serves a similar purpose as achieved by the velocity signal V and, therefore, the pressure can ultimately be applied to the ink surface within the ink tank 14. However, the pressure to be applied to the ink surface within the tank 14 and produced in response to the pressure control signal from the generator 211 is preferably higher than the pressure to be applied to the ink surface within the tank 14 and produced in response to the velocity signal V as hereinbefore described.

On the other hand, the test signal from the generator 210, when applied to the OR gate 214, passes through the gate 214 as a start signal Ss which is applied to the high voltage pulse generator 50 to effect the jetting of ink from the nozzle 15 with the recording head 11 held at the predetermined position. The differential circuit 213, after having detected the end test signal supplied thereto from the test signal generator 210, generates an output signal Sj, indicative of the end of trial jetting of ink, which is supplied to the interface 22 of the servo control circuitry of FIG. 50.

The first gate circuit 216 has a pair of fixed contacts, contact 216a being electrically connected to receive the velocity signal and the contact 216b being electrically connected to the ground, and a movable contact 216c electrically connected to the second gate circuit 215, said movable contact 216c being operatively coupled to a first gate drive circuit 217 in such a manner that, during a period in which the trigger signal Sd is applied to the drive circuit 217, the movable contact 216c is engaged with the fixed contact 216a to pass the velocity signal V through the first gate circuit 216. During the actual recording operation, the velocity signal V is successively passed through the first and second gate circuits 216 and 215 to the comparison circuit 36 on one hand and the trigger signal Sd is passed through the OR gate 214 to the high voltage pulse generator 50 to operate the ink jet generating unit 13, as hereinbefore described.

Figure 55:
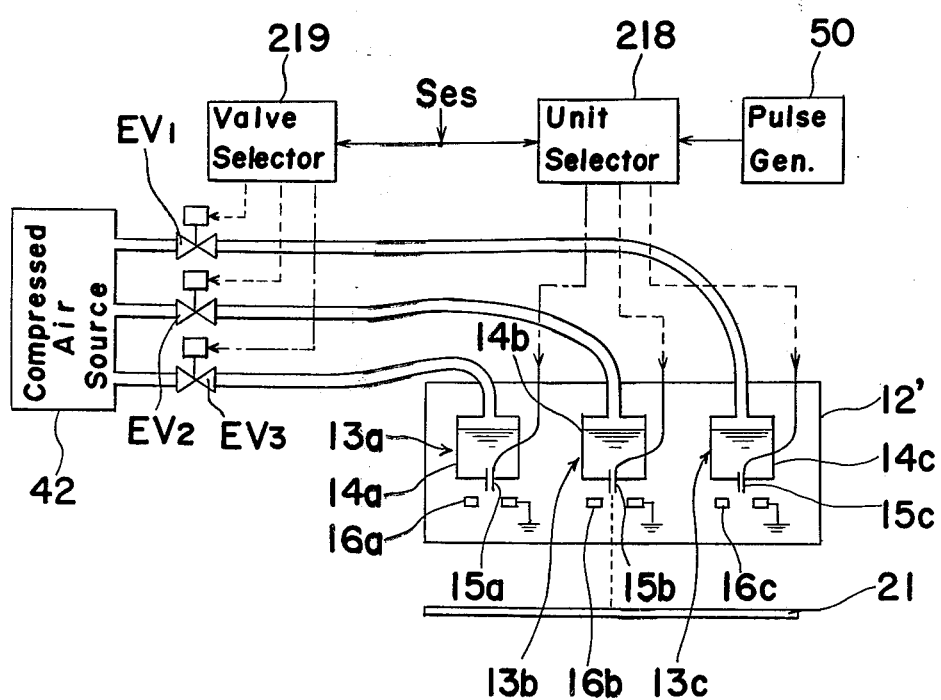
FIG. 55 is a schematic diagram of the ink supply system for the X-Y plotter of FIG. 55.
Figure 54:
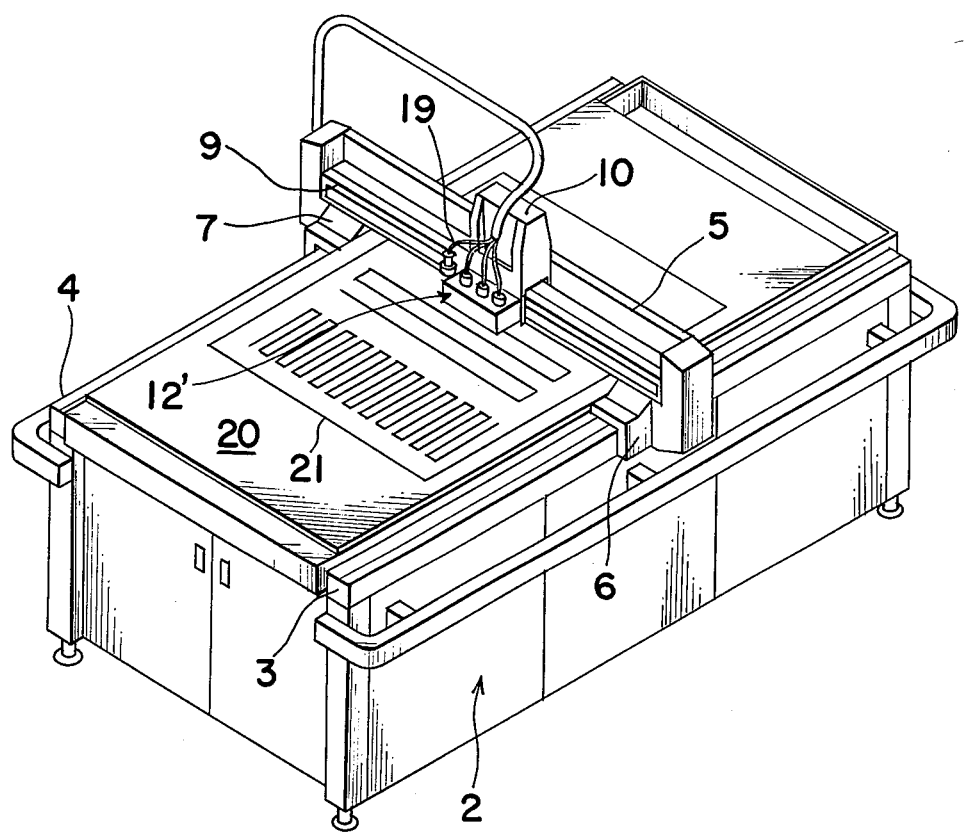
FIG. 54 is a schematic perspective view of an X-Y plotter employing an ink jet recording apparatus of a type having three nozzles which are selectively brought into operation for delineating lines of different characteristics.
Figure 56:
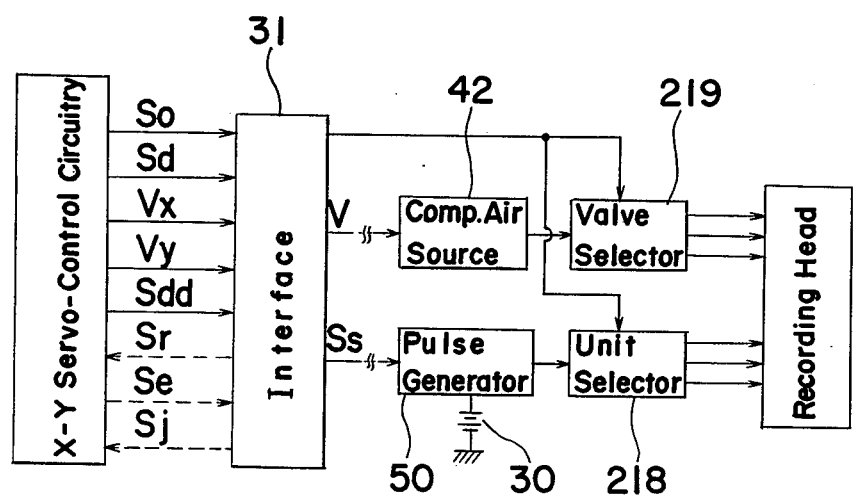
FIG. 56 is a schematic block diagram showing a circuitry employed in the X-Y plotter shown in FIGS. 54 and 55.
Figure 57:
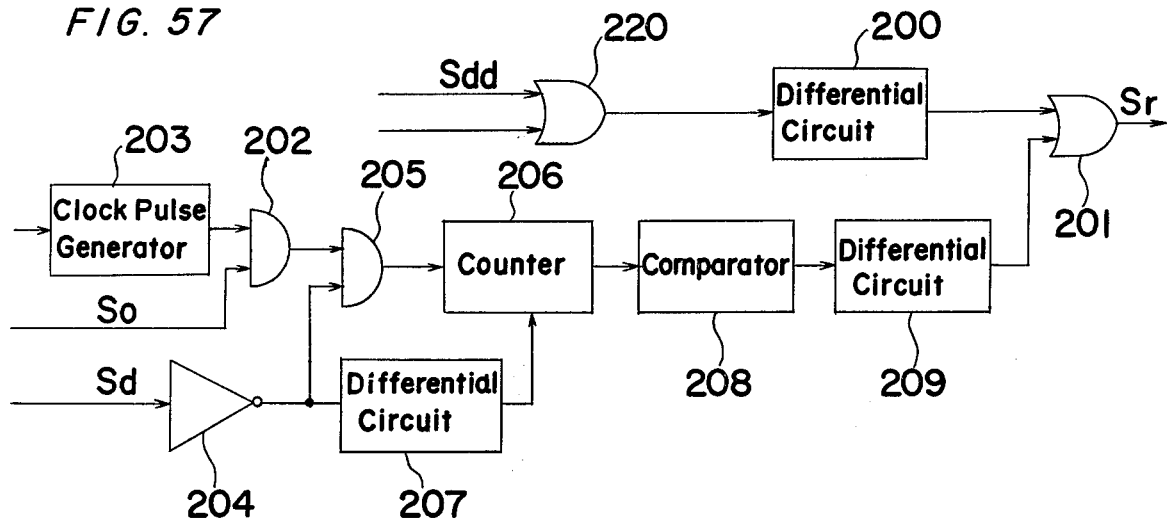
FIG. 57 is a block diagram showing a circuit for a nozzle cleaning device which can be employed in the ink jet recording apparatus embodying the present invention.

Shown in FIGS. 54 to 57 is a nozzle cleaning device utilizable in an X-Y plotter employing the ink jet recording apparatus of a type utilizing a plurality of ink jet generating units each having a construction as hereinbefore described. More particularly, as best shown in FIGS. 54 and 55, the recording heat 12' mounted on the Y-axis carriage 10 is shown to have a plurality of, for example, three, ink jet generating units 13a, 13b and 13c, each comprising an ink tank 14a, 14b or 14c, a nozzle 15a, 15b or 15c and a ring-shaped electrode 16a, 16b or 16c. These ink jet generating units 13a to 13c can have the same construction as that of the ink jet generating unit 13 mounted on the recording head 12 as hereinbefore described, but are shown to have the nozzles 15a to 15c of different inner diameter, the nozzle 15a having a larger inner diameter than that of the nozzle 15b which in turn has an inner diameter larger than that of the nozzle 15c. This is because the recording apparatus shown in FIGS. 55 to 57 is intended for use in delineating lines of different widths one at a time. The employment of the nozzles 15a to 15c of different inner diameter is based on the fact that the amount of ink jetted is proportional to the fourth power of the inner diameter of the nozzle divided by the length of such nozzle.

For selectively bringing any one of the ink jet generating units 13a to 13c into operation, a selection signal Ses fed from the interface 31 is utilized. As best shown in FIGS. 55 and 56, this selection signal Ses is applied to a unit selecting circuit 218, connected in the circuit between the high voltage pulse generator 50 and a group of the nozzles 15a to 15c, and also to a valve selecting circuit 219 for selecting the operation any one of electromagnetically operated valves $EV_1$, $EV_2$ and $EV_3$ connected between the compressed air source 42 and the group of the ink jet generating units 13a to 13c. This selection signal Ses is synthesized from a linewidth selection signal Sdd inputted to the interface 31 from the X-Y servo-control circuitry shown in FIG. 16. The linewidth selection signal Sdd may be in the form of binary-coded decimal digits where the number of the ink jet generating units is three such as shown.

Referring particularly to FIG. 57, upon generation of the linewidth selection signal Sdd from the X-Y servo-control circuitry shown in FIG. 16, this linewidth selection signal Sdd is supplied through an OR gate 220 to the differential circuit 200 and then to the OR gate 201 from which the return signal Sr is issued. As hereinbefore described with reference to FIG. 52, the return signal Sr is used to return the recording head 12' to the predetermined position for trial jetting of ink from the nozzle of one of the ink jet generating units 13a to 13c which is assigned to operate by the linewidth selection signal Sdd.

Since the linewidth selection signal is always generated from the start of operation, the trial jetting of ink with the recording head held at the predetermined position can be performed with the circuit of FIG. 57. Where the jetting of ink is interrupted for a period of time longer than the predetermined time, the trial jetting of ink can be performed in a manner similar to that described with reference to FIGS. 52 and 53.

Figure 58:
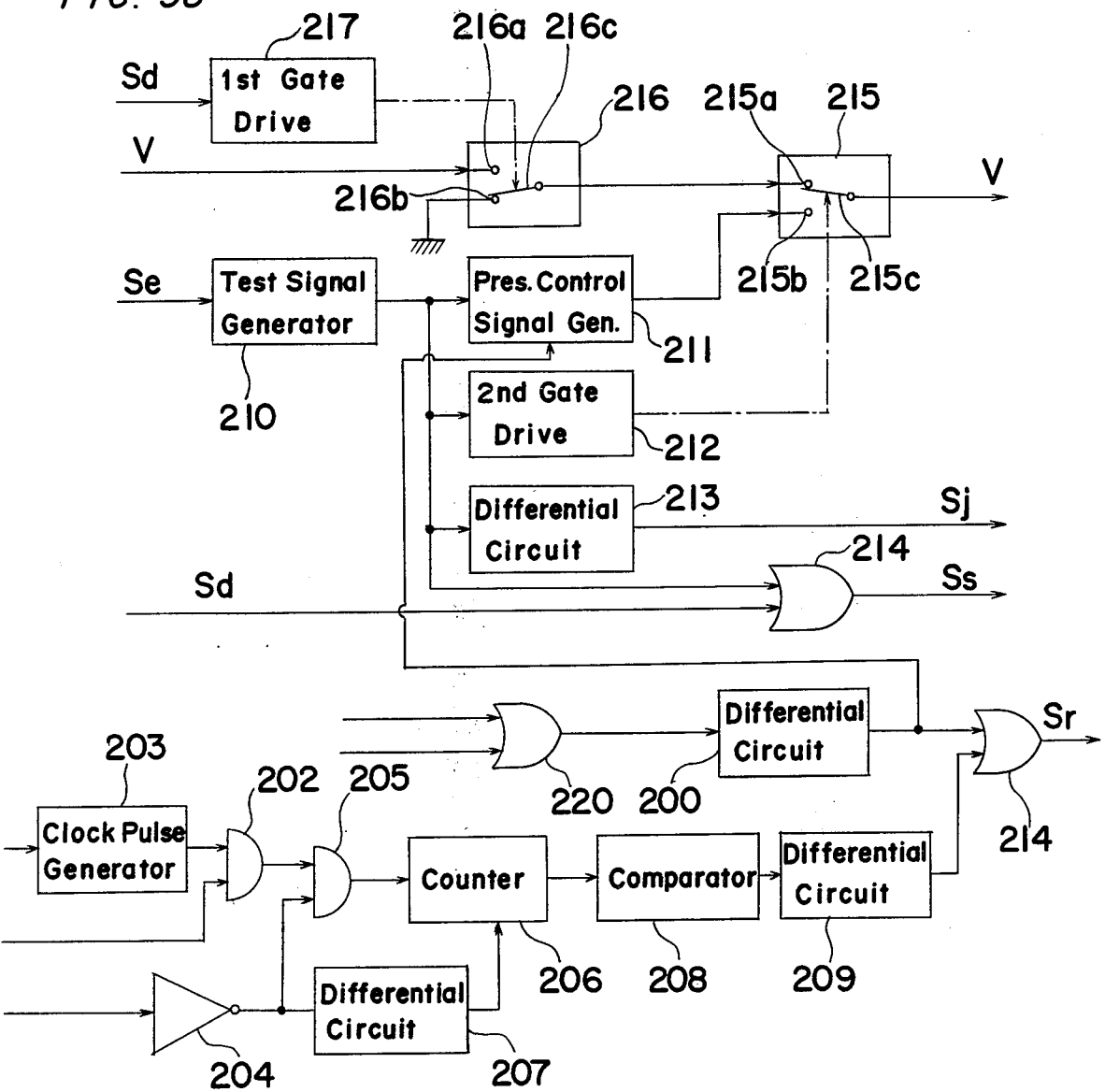
FIG. 58 is a block diagram showing a modification of the circuit for the nozzle cleaning device.

A circuitry shown in FIG. 58 is a combination of the circuitries of FIGS. 52 and 53 and has been developed on the basis of the finding that, since any possible adverse effect of drying-up of the ink within the nozzle which may occur where the jetting of ink is interrupted for a period of time longer than the predetermined time is slight and since the number of operations is small, the trial jetting of ink can be performed merely by applying a voltage without the pressure of the compressed air being relied on. The circuitry of FIG. 58 is so designed that, upon generation of the linewidth selection signal, the compressed air and the voltage are simultaneously applied to effect jetting of ink, and where the jetting of ink is interrupted for a period of time longer than the predetermined time, only the voltage is applied to effect a trial jetting of ink while the recording head is held at the predetermined position. To this end, only when the output signal is issued from the differential circuit 200 which has detected a variation in the linewidth selection signal Sdd, is the pressure control signal from the pressure control signal generator 211 generated. Therefore, when the linewidth selection signal Sdd varies, the return signal Sr is issued from the OR gate, as hereinbefore described with reference to FIG. 53, and, at the same time, the output from the differential circuit 200 is applied to the pressure control signal generator 211. In response to the output from the differential circuit 200 thus applied to the pressure control signal generator 211, the pressure control signal generator 211 generates a pressure control signal and supplies it to the second gate circuit 215 and, when the test signal is issued from the test signal generator 210 indicating that the recording head has been returned to the predetermined position, the pre-sure control signal passes through the second gate 215. The pressure control signal passing through the second gate circuit 215 is used to control the operation of the compressed air source 42 to apply the pressure to the ink tank as hereinbefore described. At the same time, the voltage is also applied. Since the return signal which is generated when the period of time during which the jetting of ink is interrupted exceeds the predetermined time does not accompany the output from the differential circuit 200, only the voltage is applied in this case.

It is to be noted that the circuitry shown in FIG. 58 is equally be applicable to the embodiment shown in FIGS. 50 to 53.

While in the circuitry shown in any one of FIGS. 50 to 53, FIGS. 55 to 57 and FIG. 58 the voltage to be applied during the trial jetting of ink has been described as that employed during the actual recording operation, the voltage to be applied during the trial jetting of ink may be higher than that applied during the actual recording operation so that cleaning of the nozzles can be facilitated by removing clogged ink from the nozzle. For this purpose, there is provided a circuitry shown in FIGS. 59 and 60, which will now be described.

Figure 59:
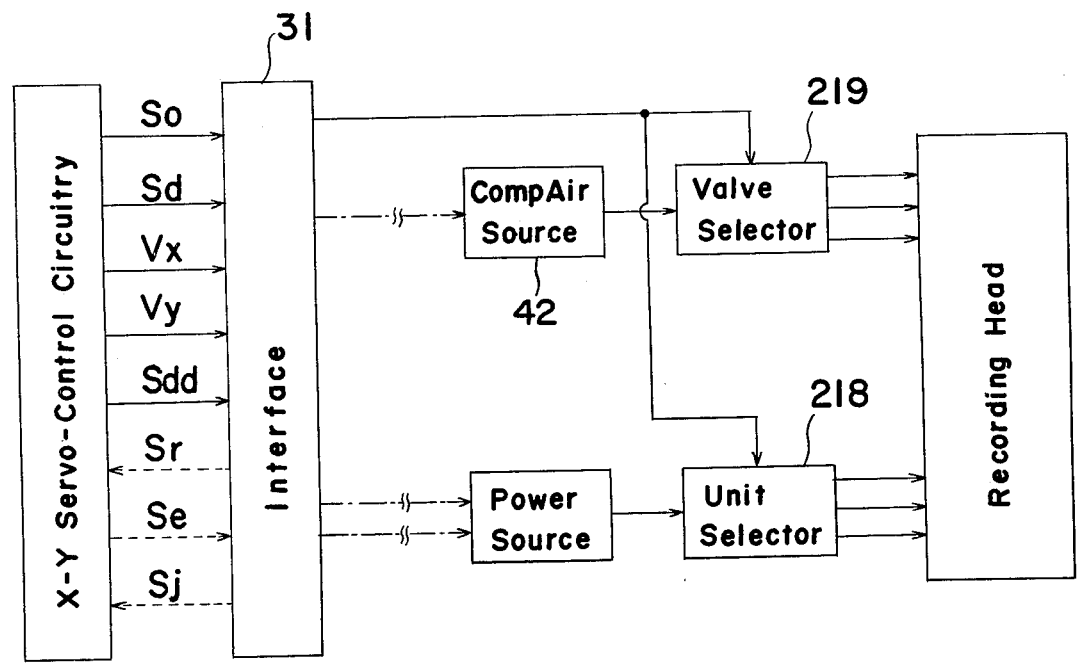
FIG. 59 is a diagram similar to FIG. 56, showing a further embodiment of the present invention wherein a different high voltage power source is employed.
Figure 60:
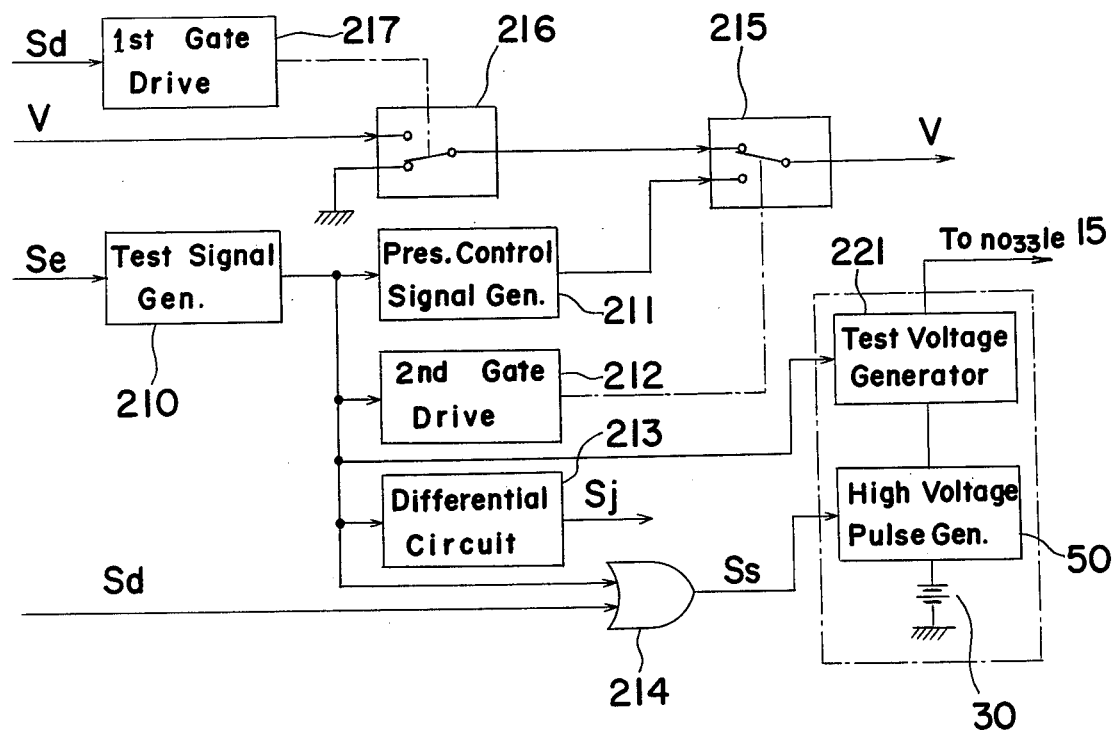
FIG. 60 is a block diagram showing the details of the power source employed in the circuitry of FIG. 59.

Referring now to FIGS. 59 and 60, the high voltage power source, which has been described as constituted by the high voltage pulse generator 50 and the bias voltage source 30 is shown to additionally include a test voltage generator 221 connected in a circuit between the high voltage pulse generator 50 and the nozzles 15a to 15c and adapted to receive the test signal issued from the test signal generator 210, the mode of operation of said test voltage generator 221 being controlled by the test signal from the test signal generator 210. The high voltage power source shown in FIG. 60 may be employed in the circuitry shown in FIG. 58. Moreover, the circuitry of the high voltage power source shown in FIG. 60 is equally applicable to the circuitry shown in any one of FIGS. 50 to 53 and FIGS. 55 to 57.

In the circuit arrangement shown in FIG. 17, it has been found that, since the switching voltage to be applied to the nozzle 15 from the voltage power source including the bias voltage source 30 and the high voltage pulse generator 50 has a constant, predetermined value, the speed of transformation of the ink into the fine droplets tends to be reduced, thereby adversely affecting the finish of the ultimately delineated line, during a recording operation in which the recording head 12 is moved at a relatively high speed.

Figure 61:
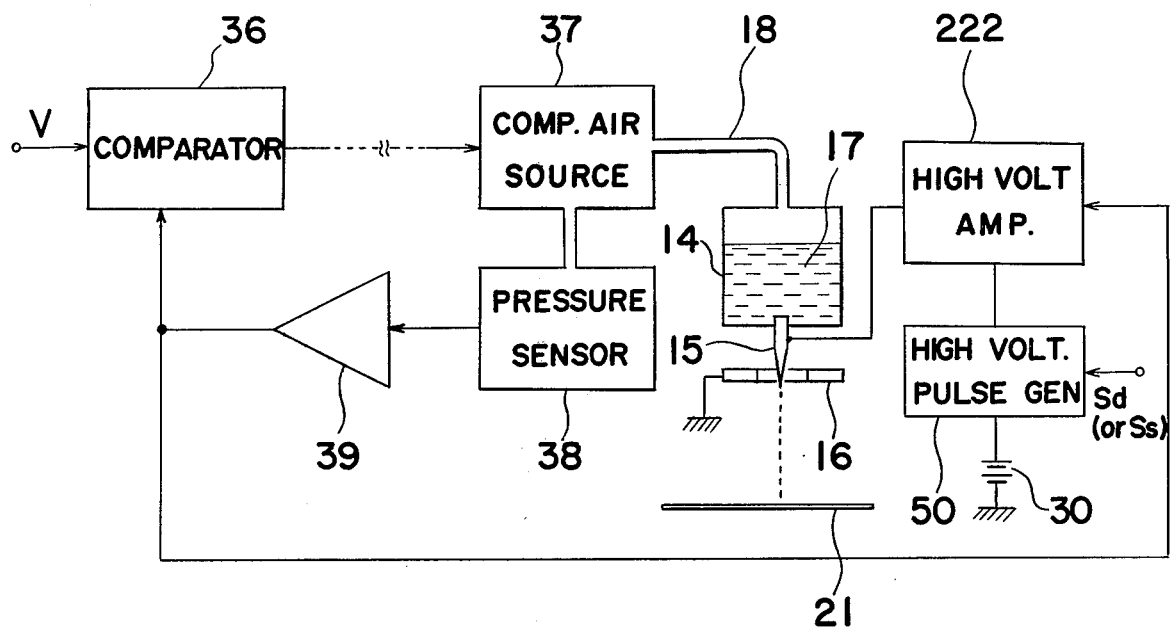
FIG. 61 is a diagram similar to FIG. 17, showing a further embodiment of the present invention wherein a still further high voltage power source is employed.

This can be overcome by employing the high voltage power source constructed as shown in FIG. 61, reference to which will now be made.

Figure 62:
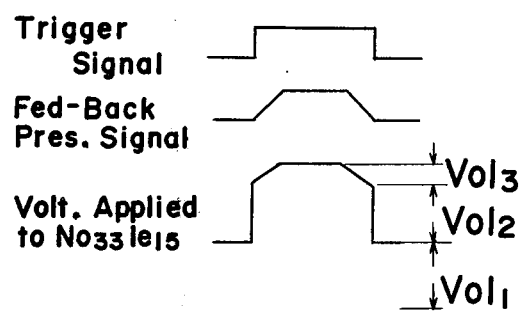
FIG. 62 is a chart showing waveforms of signals appearing in the circuit of FIG. 61 which are shown in timed relation to each other.

Referring now to FIG. 61, in the circuit between the high voltage pulse generator 50 and the nozzle 15, is connected a high voltage amplifier 222 is inserted and is connected to the output terminal of the negative feed-back amplifier 39 so that the high voltage amplifier 222 can generate, in response to the output from the amplifier 39, a voltage in proportion to the pressure being applied to the ink surface within the ink tank 14. The voltage generated by the high voltage amplifier 222 is subsequently superimposed upon the switching voltage outputted from the high voltage pulse generator 50 in response to the trigger signal Sd or Ss. FIG. 62 is a diagram showing the waveforms of the output from the negative feed-back amplifier 39, the voltage applied to the nozzle 15 from the high voltage amplifier 222 and the trigger signal Sd or Ss.

As hereinbefore described, so long as no trigger signal is applied to the high voltage pulse generator 50, the pressure acting on the ink surface within the ink tank 14 is zero (i.e., equal to the atmospheric pressure), the level of the output from the pressure sensor 38 is also zero and, therefore, the level of the output from the high voltage amplifier 222 is zero. In this condition, only the bias voltage $Vol_1$ from the bias voltage source 30 is applied to the nozzle 15 and, therefore, the meniscus of ink is formed at the tip of the nozzle 15 in readiness for the jetting thereof towards the recording medium 21.

When the trigger signal Sd or Ss is subsequently applied to the high voltge pulse generator 50, the latter generates the switching voltage $Vol_2$ which is superimposed upon the bias voltage $Vol_1$ and is then applied to the nozzle 15 to effect the jetting of ink from the nozzle 15 towards the recording medium 21. Simultaneously therewith, each component of the compressed air source 42 is brought into operation and the output signal from the pressure sensor 38, which is indicative of the pressure acting on the ink surface within the ink tank 14, is applied through the negative feed-back amplifier 39 to the voltage amplifier 222 which serves to superimpose a negative fed-back voltage $Vol_3$ from the amplifier 39 on the switching voltage, which has already been superimposed upon the bias voltage, in correspondence to the pressure detected by the pressure sensor 38. This fed-back voltage $Vol_3$ varies with the change in pressure of the compressed air being supplied to the ink tank 14 and, accordingly, varies in proportion to the recording velocity and the amount of ink jetted.

From the foregoing, it is clear that, since the voltage to be applied to the nozzle 15 is variable in response to the change in pressure of the compressed air fed to the ink tank 14, transformation of the ink meniscus into the fine droplets and then into a jet of ink can readily take place.

Figure 63:
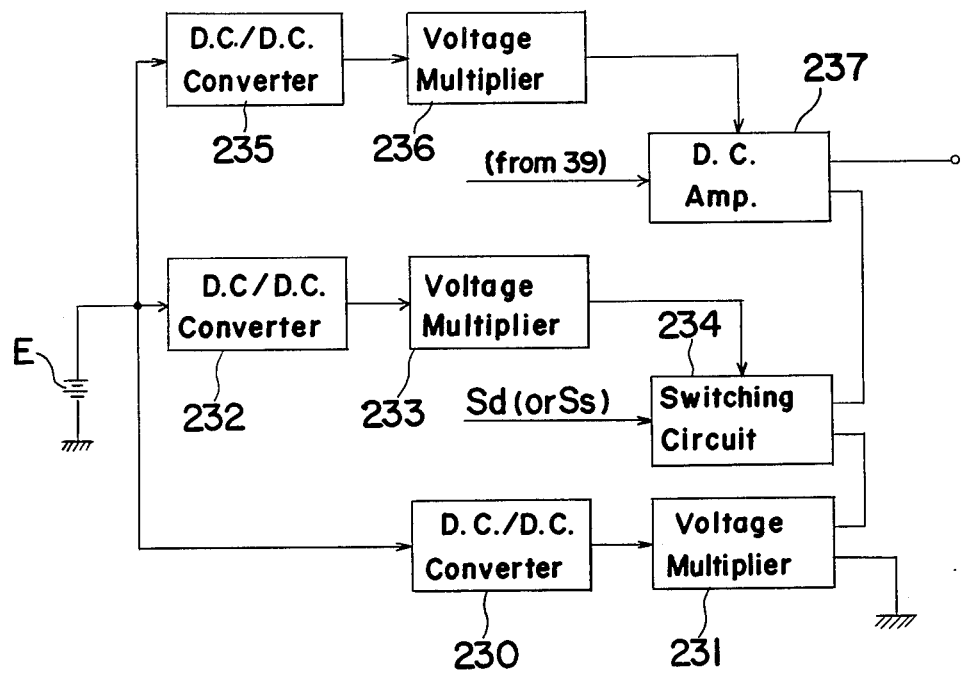
FIG. 63 is a block diagram showing the details of a circuit for the high voltage power source employed in the circuit of FIG. 61.

In practice, the high voltage power source having the circuit arrangement shown in FIG. 60 is constructed as shown in FIG. 63.

Referring to FIG. 63, the bias voltage source 30 is shown to be composed of a D.C./D.C. converter 230 having an input terminal connected to a D.C. power source E of 24 volts and an output terminal connected to a voltage multiplying and rectifying circuit 231. This bias voltage source 30 is so designed that the voltage from the power source E can be amplified by the converter 230 to about 300 volts which is further amplified to about 1,100 volts by the multiplying and rectifying circuit 231 which is composed of four voltage multiplying and rectifying circuit components connected in cascade.

The high voltage pulse generator 50 is shown to be composed of a D.C./D.C. converter 232, a voltage multiplying and rectifying circuit 233, and a high voltage switching circuit 234 all connected in series with each other, the input terminal of said converter 232 being connected to the common D.C. power source E. The switching circuit 234 is adapted to receive the trigger signal Sd or SS by which the mode of operation of said switching circuit 234 is controlled to selectively switch the output voltage therefrom off and on.

The high voltage amplifier 222 is shown to be composed of a D.C./D.C. converter 235 for amplifying the voltage from the common power source E to 300 volts and a voltage multiplying and rectifying circuit 236, composed of a single voltage multiplying and rectifying circuit component, for amplifying the voltage from the converter 235 to about 500 volts which is subsequently supplied to a D.C. amplifier 237 which generates an output signal in response to the pressure signal applied thereto from the pressure sensor 38 through the feedback amplifier 39.

The voltage multiplying and rectifying circuit 231, the switching circuit 234 and the D.C. amplifier 237 are connected in series from the ground so that the output voltage emerging from the amplifier 237 and supplied to the nozzle 15 has a waveform such as shown in FIG. 62. It is clear that the output voltage applied to the nozzle 15 from the amplifier 237 has a waveform corresponding to that of the fed-back pressure signal.

Figure 65:
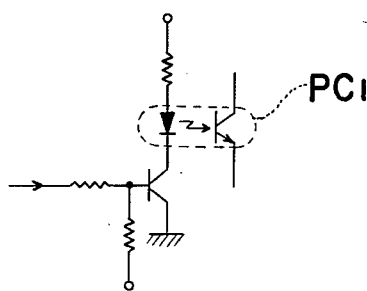
FIGS. 65 and 66 illustrate photocouplers employed in input stages of a D.C. amplifier and switching circuit employed in the circuits of FIGS. 63 and 64.
Figure 66:
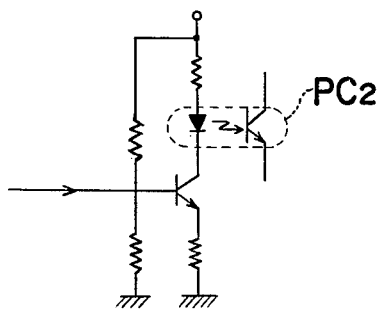

It is to be noted that input stages of the switching circuit 234 and the D.C. amplifier 237 employ respective photo-couplers PC$_1$ and PC$_2$ as shown in FIGS. 65 and 66. By the use of the photo-coupler PC$_1$ and PC$_2$, any possible breakage of the circuit 234 or 237 resulting from the application of the high voltage thereto can advantageously be avoided. In the circuit shown in FIG. 63, the input stage of the amplifier 237 and that of the switching circuit 234 require a break-down voltage of about 2.2 Kv. or more and 2.7 Kv. or more, respectively.

Figure 64:
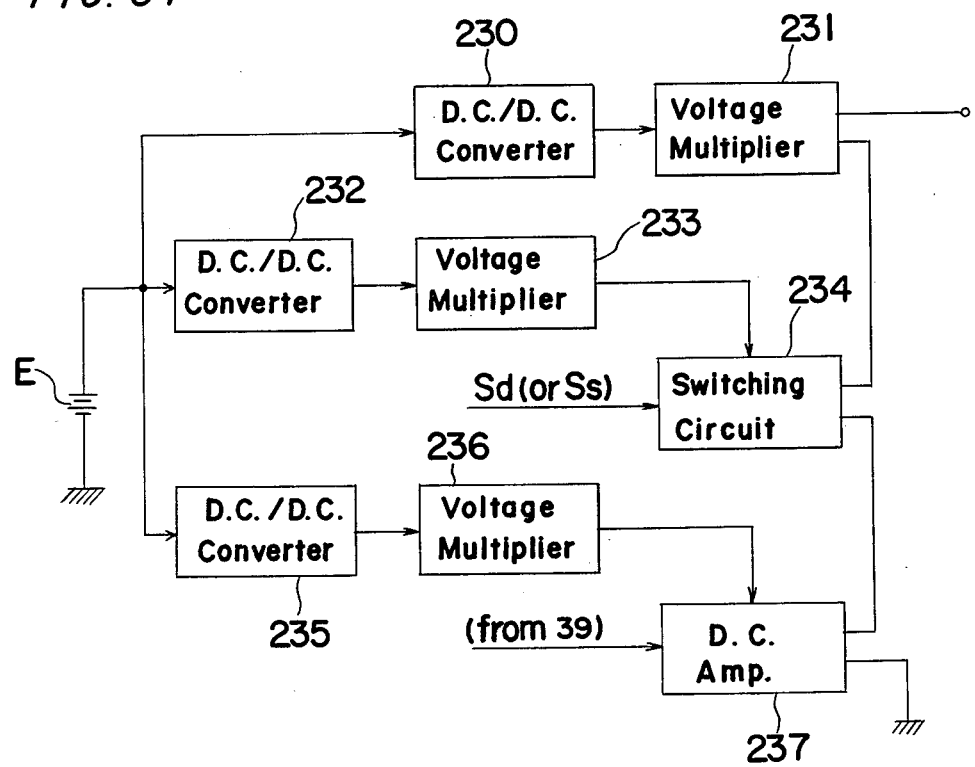
FIG. 64 is a diagram similar to FIG. 63, showing a modified form of the high voltage power source circuit of FIG. 63.

If the order of connection of the voltage multiplying and rectifying circuit 231, the switching circuit 234 and the amplifier 237, shown in FIG. 63, is reversed such as shown in FIG. 64 in consideration of the break-down voltage of each of the photo-couplers PC$_1$ and PC$_2$ (and accordingly, the bias voltage source 30 and the high voltage amplifier 222 shown in FIG. 61 have their positions reversed with respect to the high voltage pulse generator 50), the individual break-down voltages of the input stages of the D.C. amplifier 237 and the voltage multiplying and rectifying circuit 231 can be reduced to 1.6 Kv. or more and 500 v. or more, respectively, although the output voltage emerging from the amplifier 237 and applied to the nozzle 15 has substantially the same waveform as shown in FIG. 62.

Although the present invention has fully been described in connection with the preferred embodiments thereof with reference to the accompanying drawings, it is to be noted that various changes and modifications will be apparent to those skilled in the art. By way of example, the ink jet recording apparatus according to the present invention can equally be applicable to any type of X-Y plotter having digital-controlled X-axis and Y-axis servomotors.

Accordingly, such changes and modifications are to be understood as being included within the true scope of the present invention unless they depart thereform.

What is claimed is:

1. An ink jet recording apparatus having at least one ink tank for containing therein a sustantial amount of ink, a nozzle connected to said ink tank for discharging the ink within the ink tank to the outside of said ink tank, an electrode supported in position in spaced relation to said nozzle, means connected to said nozzle and said electrode for applying a voltage between said nozzle and said electrode for establishing an electric field between said nozzle and said electrode, said nozzle and voltage applying means having a shape and applying a sufficient voltage for producing an electric field having an intensity which is symmetrical with respect to the center of the nozzle for causing the ink droplets to travel straight from the nozzle and having a strength for causing the ink to be drawn out of the nozzle due to the field alone, means connected to said nozzle for moving the nozzle relative to a recording medium with the tip of the nozzle spaced a predetermined distance from the recording medium, and means for controlling the amount of ink jetted from the nozzle towards the recording medium, said controlling means comprising;

pressure control means connected to said tank for controlling the static air pressure acting on the surface of the ink within the ink tank to an amount less than that necessary to jet ink from the nozzle solely by the air pressure and for varying the static air pressure for varying the amount of ink jetted from the nozzle in proportion to the air pressure;

pressure sensor means connected to said tank for detecting the air pressure acting on the surface of the ink within the ink tank and for generating an output signal indicative of the value of the pressure thus detected;

signal generating means for generating a signal corresponding to the value of an air pressure equivalent to an amount of the ink which is desired to be jetted from the nozzle in relation to the operation of the ink jet recording apparatus in order to draw a line of a predetermined width;

comparison means connected to said signal generating means and said pressure sensor means for comparing the output signal from said pressure sensor means with the signal from said signal generating means for generating an output signal indicative of any difference therebetween; and operating means connected between said comparison means and said pressure control means for operating the pressure control means in response to the output signal from said comparison means, whereby the ink jetted from the nozzle is controlled to draw a line of predetermined width.

2. An ink jet recording apparatus having at least one ink tank for containing therein a substantial amount of ink, a nozzle connected to said ink tank for discharging the ink within the ink tank to the outside of said ink tank, an electrode supported in position in spaced relation to said nozzle, means connected to said nozzle and said electrode for applying a voltage between said nozzle and said electrode for establishing an electric field between said nozzle and said electrode, said nozzle and voltage applying means having a shape and applying a sufficient voltage for producing an electric field having an intensity which is symmetrical with respect to the center of the nozzle for causing the ink droplets to travel straight from the nozzle and having a strength for causing the ink to be drawn out of the nozzle due to the field alone, means connected to said nozzle for moving the nozzle relative to a recording medium with the tip of the nozzle spaced a predetermined distance from the recording medium, velocity detecting means associated with said nozzle and said recording medium for detecting the velocity of said relative movement of the nozzle and the recording medium for generating an output signal indicative of the detected velocity, and means for controlling the amount of ink jetted from the nozzle towards the recording medium for drawing lines of predetermined width, said controlling means comprising;

pressure control means connected to said tank for controlling the static air pressure acting on the surface of the ink within the ink tank to an amount less than that necessary to jet ink from the nozzle solely by the air pressure and for varying the static air pressure and for varying the amount of ink jetted from the nozzle in proportion to the air pressure;

pressure sensor means connected to said tank for detecting the air pressure acting on the surface of the ink within the ink tank and for generating an output signal indicative of the value of the pressure thus detected;

comparison means connected to said pressure sensor means and said velocity detecting means for comparing the output signal from the pressure sensor means with the output signal from the velocity detecting means and for generating an output signal indicative of any difference therebetween; and operating means connected between said comparison means and said pressure control means for operating the pressure control means in response to the output signal from said comparison means, whereby the ink jetted from the nozzle is controlled in accordance with the variance of the relative velocity of the nozzle and the recording medium.

3. An apparatus as claimed in claim 2, wherein the pressure control means comprises a pulse motor, the angle of rotation of which is controlled in accordance with the output signal from the comparison means, an air pump having a piston member operatively coupled to said pulse motor, and a flexible tubing for supplying compressed air from the air pump to the ink tank.

4. An apparatus as claimed in claim 2, further comprising a detector for detecting a reduction of the amount of the ink within the ink tank and for generating an output control signal and connected to said pressure control means for controlling the pressure of the compressed air for compensating for a reduction in the static pressure of the ink within the ink tank resulting from such reduction of the amount of the ink within the ink tank.

5. An apparatus as claimed in claim 2, further comprising a temperature sensor in said ink tank for detecting the temperature of the ink within the ink tank and for generating a control signal and connected to said pressure control means for controlling the pressure control means for avoiding variation in the amount of the ink jetted which may result from change in viscosity of the ink due to change in temperature of the ink within the ink tank.

6. An apparatus as claimed in claim 2, further comprising a stabilizer accommodated within the ink tank for suppressing motion of the body of the ink within the ink tank which may otherwise result during the relative movement of the nozzle and the recording medium.

7. An apparatus as claimed in claim 2, further comprising a line-width selection signal generating means, and means connected to said line width selection signal generating means and connected between said pressure sensor means and said comparison means for varying the gain of the output signal from the pressure sensor means and supplied to the comparison means.

8. An apparatus as claimed in claim 7, wherein said varying means includes an amplifier, the gain of which is adjustable and to which the output signal from the pressure sensor means is applied, and said line-width selection signal generating means includes means for controlling the gain of the amplifier for varying the output signal from the pressure sensor means in accordance with the gain to cause the output signal from the comparing means to vary for thereby operating the pressure control means so as to adjust the pressure of the compressed air supplied to the ink tank so that a line of desired width can be delineated on the recording medium by the jet of ink issued from the nozzle.

9. An apparatus as claimed in claim 2 further comprising a line-width selection signal generating means and means connected to said line-width selection signal generating means and connected between said velocity detecting means and said comparison means for varying the gain of the control signal supplied to said comparison means from said detecting means.

10. An apparatus as claimed in claim 9, wherein said varying means includes an amplifier, the gain of which is adjustable and to which the output signal from the velocity detecting means is applied, and said line-width selection signal generating means includes a means for controlling the gain of the amplifier for varying the velocity signal in accordance with the gain to cause the output signal from the comparing means to vary for thereby operating the pressure control means so as to adjust the pressure of the compressed air supplied to the ink tank so that a line of desired width can be delineated on the recording medium by the jet of ink issued from the nozzle.

11. An apparatus as claimed in claim 2, wherein said voltage applying means comprises a bias voltage source for generating a bias voltage for forming a meniscus of ink at the tip of the nozzle and a switching voltage source for generating a switching voltage necessary to draw the ink droplets successively from the tip of the nozzle.

12. An apparatus as claimed in claim 11, wherein the voltage applying means further includes means connected to said pressure sensor means for further applying between the nozzle and the principal electrode a voltage proportional to the output signal from the pressure sensor means during the application of the switching voltage.

13. An ink jet recording apparatus having at least one ink tank for containing therein a substantial amount of ink, a nozzle connected to said ink tank for discharging the ink within the ink tank to the outside of the ink tank, an electrode supported in position in spaced relation to said nozzle, means connected to said nozzle and said electrode for applying a voltage between the nozzle and the electrode for establishing an electric field between the nozzle and the electrode, said nozzle and voltage applying means having a shape and applying a sufficient voltage for producing an electric field having an intensity which is symmetrical with respect to the center of the nozzle for causing the ink droplets to travel straight from the nozzle and having a strength for causing the ink to be drawn out of the nozzle due to the field alone, means connected to the nozzle for moving the nozzle relative to a recording medium, and means for controlling the amount of ink jetted from the nozzle towards the recording medium, said controlling means comprising;

pressure control means connected to said tank for controlling the static air pressure acting on the surface of the ink within the ink tank to an amount less than that necessary to jet ink from the nozzle solely by the air pressure and for varying the static air pressure and for varying the amount of ink jetted from the nozzle in proportion to the air pressure;

pressure sensor means connected to said tank for detecting the pressure acting on the surface of the ink within the ink tank and for generating an output signal indicative of the pressure thus detected;

means associated with said nozzle and the recording medium for detecting the velocity of relative movement of the nozzle and the recording medium and for generating an output signal proportional to the detected velocity;

comparison means connected to said pressure sensor means and said velocity detecting means for comparing the output signal from the velocity detecting means for generating an output signal indicative of any difference therebetween; and means connected between said comparison means and said pressure control means for operating the pressure control means in response to the output signal from said comparing means;

said pressure control means having a pulse motor, the angle of rotation of which is controlled by the output signal from the operating means, motion translator means connected to the pulse motor for translating the rotation of the pulse motor into a linear motion, an air pump including a sealed cylinder and a piston operatively accommodated within said cylinder for adjusting the volume of the interior of said cylinder, means connected between the motion translator means and the piston for transmitting the linear motion to the piston, and a flexible tubing having its ends connected to the ink tank and the cylinder, respectively, for transmitting the pressure evolved within the cylinder by said piston to the ink tank whereby the ink jetted from the nozzle is controlled in accordance with the pressure transmitted to the ink tank.

14. An apparatus as claimed in claim 13, wherein the motion translating means comprises an eccentric cam member rotatable together with the rotation of the pulse motor and a rod member coupled to said eccentric cam for reciprocal movement in a linear direction in synchronism with the rotation of the eccentric cam.

* * * * *